United States Patent
Nakao et al.

(10) Patent No.: US 11,030,251 B2
(45) Date of Patent: Jun. 8, 2021

(54) METHOD AND SYSTEM FOR PROVIDING QUERY SUGGESTIONS BASED ON PERSONALIZED SPELLING CORRECTION

(71) Applicant: Yahoo Holdings, Inc., Sunnyvale, CA (US)

(72) Inventors: Kazuhiro Nakao, Sunnyvale, CA (US); Shenhong Zhu, Santa Clara, CA (US); Hang Su, Washington, DC (US)

(73) Assignee: Verizon Media Inc., New York, NY (US)

( * ) Notice: Subject to any disclaimer, the term of this patent is extended or adjusted under 35 U.S.C. 154(b) by 1125 days.

(21) Appl. No.: 15/272,959

(22) Filed: Sep. 22, 2016

(65) Prior Publication Data

US 2018/0081989 A1    Mar. 22, 2018

(51) Int. Cl.
*G06F 16/00* (2019.01)
*G06F 16/9032* (2019.01)
*G06F 16/9535* (2019.01)

(52) U.S. Cl.
CPC .... *G06F 16/90328* (2019.01); *G06F 16/9535* (2019.01)

(58) Field of Classification Search
None
See application file for complete search history.

(56) References Cited

U.S. PATENT DOCUMENTS

| | | | | |
|---|---|---|---|---|
| 7,296,019 | B1 * | 11/2007 | Chandrasekar | G06F 40/232 |
| 7,603,349 | B1 * | 10/2009 | Kraft | G06Q 10/10 |
| 2011/0202876 | A1 * | 8/2011 | Badger | G06F 3/04883 |
| | | | | 715/816 |
| 2013/0325343 | A1 * | 12/2013 | Blumenberg | G01C 21/00 |
| | | | | 701/533 |
| 2014/0108445 | A1 * | 4/2014 | Oztekin | G06F 16/90324 |
| | | | | 707/767 |
| 2017/0024657 | A1 * | 1/2017 | Sahu | G06F 16/951 |
| 2017/0097940 | A1 * | 4/2017 | Panuganty | G06F 16/90324 |
| 2017/0275139 | A1 * | 9/2017 | Turek | B66B 21/02 |

* cited by examiner

*Primary Examiner* — Debbie M Le
(74) *Attorney, Agent, or Firm* — Pillsbury Winthrop Shaw Pittman LLP

(57) ABSTRACT

The present teaching relates to providing a query suggestion. In one example, a request is received for query suggestions with respect to a query prefix input by a user. Personal data of the user are obtained. One or more spelling correction candidates are generated based on the personal data and the query prefix. Each of the one or more spelling correction candidates represents a possible spelling correction of the query prefix that was likely input incorrectly in view of the personal data. One or more query suggestions are determined based on the one or more spelling correction candidates. The one or more query suggestions are provided as a response to the request.

21 Claims, 16 Drawing Sheets

METHOD AND SYSTEM FOR PROVIDING QUERY SUGGESTIONS BASED ON PERSONALIZED SPELLING CORRECTION

BACKGROUND

1. Technical Field

The present teaching relates to methods, systems, and programming for Internet services. Particularly, the present teaching is directed to methods, systems, and programming for providing search suggestions based on personalized spelling correction.

2. Discussion of Technical Background

Online content search is a process of interactively searching for and retrieving requested information via a search application running on a local user device, such as a computer or a mobile device, from online databases. Online search is conducted through search engines, which are programs running at a remote server and searching documents for specified keywords and return a list of the documents where the keywords were found. Almost all known search engines and many search services in apps or websites can provide search suggestions beneath their search box as users type their queries to help users formulate queries quickly. Some of the search engines may correct a user's misspellings even when the user's query is still incomplete, and provide spell-corrected search suggestions.

Traditional spelling corrections are provided based on pre-built data models, e.g. language model, error model, and candidate model. But these models are built based on large scale of data, such as web corpus or query log, to provide statistically correct data. As such, the existing query suggestion techniques cannot provide correct spelling correction data for personal data, such as personal query history or contact list, because available training data is too small to build the data models. In addition, known spelling correction techniques focus on general population instead of the user submitting the query.

Therefore, there is a need to provide an improved solution for providing query suggestions to solve the above-mentioned problems.

SUMMARY

The present teaching relates to methods, systems, and programming for Internet services. Particularly, the present teaching is directed to methods, systems, and programming for providing search suggestions based on personalized spelling correction.

In one example, a method, implemented on a machine having at least one processor, storage, and a communication platform capable of connecting to a network for providing a query suggestion is disclosed. A request is received for query suggestions with respect to a query prefix input by a user. Personal data of the user are obtained. One or more spelling correction candidates are generated based on the personal data and the query prefix. Each of the one or more spelling correction candidates represents a possible spelling correction of the query prefix that was likely input incorrectly in view of the personal data. One or more query suggestions are determined based on the one or more spelling correction candidates. The one or more query suggestions are provided as a response to the request.

In a different example, a system having at least one processor, storage, and a communication platform capable of connecting to a network for providing a query suggestion is disclosed. The system includes: a query suggestion request parser configured for receiving a request for query suggestions with respect to a query prefix input by a user; a personal data retriever configured for obtaining personal data of the user; a spelling correction candidate generator configured for generating one or more spelling correction candidates based on the personal data and the query prefix, wherein each of the one or more spelling correction candidates represents a possible spelling correction of the query prefix that was likely input incorrectly in view of the personal data; a spelling correction candidate evaluator configured for determining one or more query suggestions based on the one or more spelling correction candidates; and a query suggestion integrator configured for providing the one or more query suggestions as a response to the request.

Other concepts relate to software for implementing the present teaching on providing search suggestions based on personalized spelling correction. A software product, in accord with this concept, includes at least one machine-readable non-transitory medium and information carried by the medium. The information carried by the medium may be executable program code data, parameters in association with the executable program code, and/or information related to a user, a request, content, or information related to a social group, etc.

In one example, a machine-readable, non-transitory and tangible medium having information recorded thereon for providing a query suggestion is disclosed. The information, when read by the machine, causes the machine to perform the following: receiving a request for query suggestions with respect to a query prefix input by a user; obtaining personal data of the user; generating one or more spelling correction candidates based on the personal data and the query prefix, wherein each of the one or more spelling correction candidates represents a possible spelling correction of the query prefix that was likely input incorrectly in view of the personal data; determining one or more query suggestions based on the one or more spelling correction candidates; and providing the one or more query suggestions as a response to the request.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
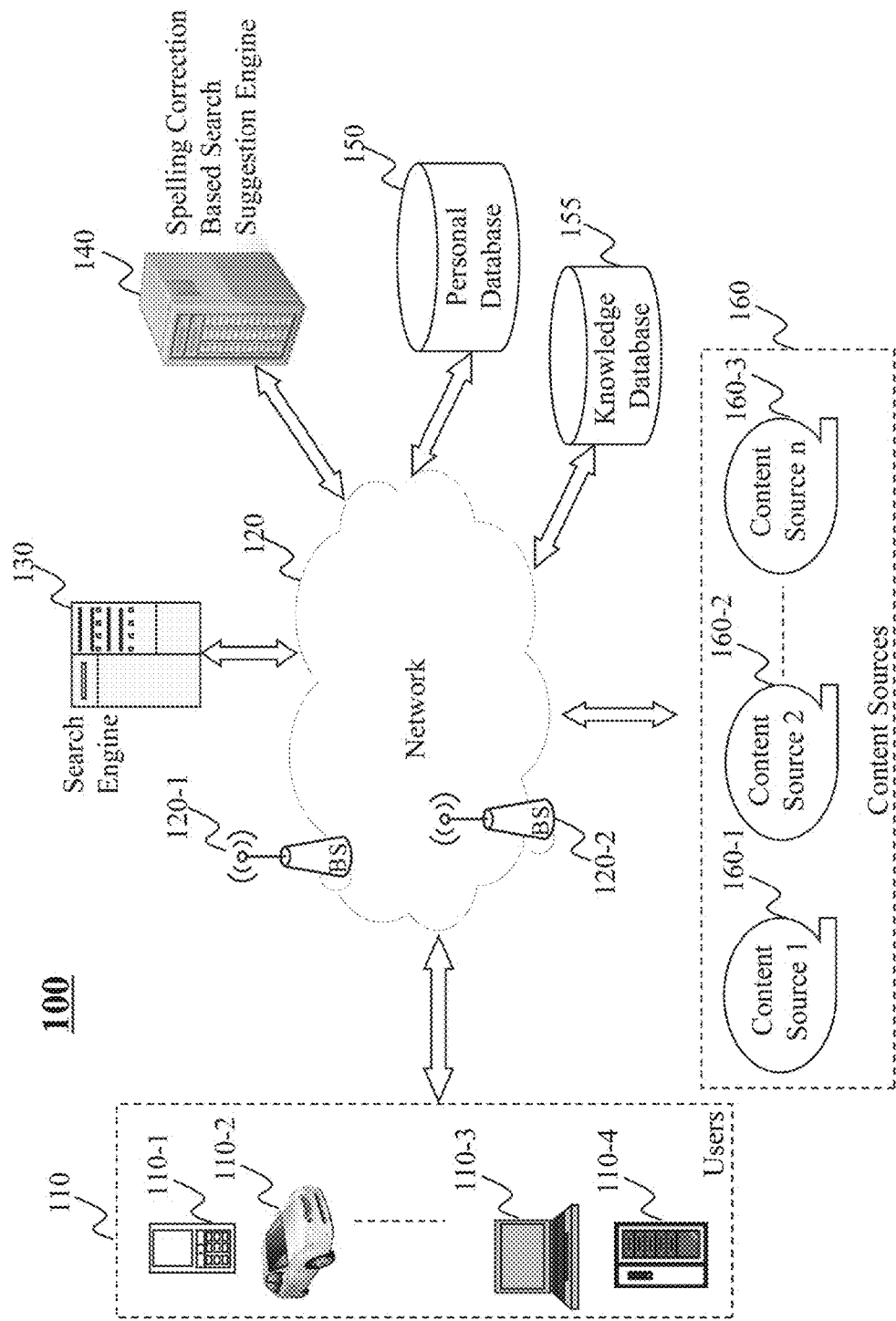
FIG. 1 is a high level depiction of an exemplary networked environment for providing spelling correction based query suggestions, according to an embodiment of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

The present disclosure describes method, system, and programming aspects of efficiently and effectively providing search suggestions. The method and system as disclosed herein aim at improving end-users' search experience by reducing user efforts in formulating queries. For any prefix input by a user, the disclosed system can generate spelling correction based query suggestions based on the prefix and personal data of the user. The personal data may include the user's personal contact list, personal search history, personal online chat history, personal emails, personal calendar input, etc.

A traditional spelling correction may be made possible by pre-built three types of data model: language model, error model, and candidate model. The candidate model is used to find or generate spelling correction candidates. The language model helps to find more likely query for most people. The error model helps to evaluate how close each candidate is to the original user's query. These models are built based on large scale of data, such as web corpus or query log, so that they can provide statistically correct data.

One of the important features in a search suggestion system is to include suggestions from user's personal data source, such as user's contact list or past queries submitted by the user (search history), as part of search suggestions. The traditional spelling correction method does not work well with personal data source since the personal data is usually way too small to build language model, error model, and candidate model in a statistically meaningful manner, and it is also quite inefficient, in both space and time perspective. Also, general spelling corrections that are good for non-personal data source may not be good for a user's own personal data, that is, candidate model built for a general population may not work well for personal data.

The disclosed method in the present teaching is proposed to provide spelling corrections from personal data source without building complicated data models, since unique characteristic of personal data source could not provide enough training data. In one embodiment, the proposed method first shortens the user's input step by step, then uses a simplified candidate evaluation function to evaluate each spelling correction candidate and decide if a spelling correction should be accepted or not. While most existing spelling correction methods focus on full queries after being submitted to search engine, the disclosed method is used for partial query (also called prefix) before being submitted. The disclosed method not only addresses unique characteristics of personal data source, but also provides an efficient way to implement spelling corrected query suggestions in a real-time system.

The terms "query suggestion" and "search suggestion" may be used interchangeably herein. The terms "query prefix" and "prefix" may be used interchangeably herein.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

FIG. 1 is a high level depiction of an exemplary networked environment 100 for providing spelling correction based query suggestions, according to an embodiment of the present teaching. In FIG. 1, the exemplary networked environment 100 includes one or more users 110, a network 120, a search engine 130, a spelling correction based search suggestion engine 140, a personal database 150, a knowledge database 155, and content sources 160. The network 120 may be a single network or a combination of different networks. For example, the network 120 may be a local area network (LAN), a wide area network (WAN), a public network, a private network, a proprietary network, a Public Telephone Switched Network (PSTN), the Internet, a wireless network, a virtual network, or any combination thereof.

The network 120 may also include various network access points, e.g., wired or wireless access points such as base stations or Internet exchange points 120-1 . . . 120-2, through which a data source may connect to the network 120 in order to transmit information via the network 120.

Users 110 may be of different types such as users connected to the network 120 via desktop computers 110-4, laptop computers 110-3, a built-in device in a motor vehicle 110-2, or a mobile device 110-1. In one embodiment, users 110 may be connected to the network 120 and able to interact with the search engine 130 and the spelling correction based search suggestion engine 140 through wired or wireless technologies and related operating systems implemented within user-wearable devices (e.g., glasses, wrist watch, etc.).

A user, e.g., the user 110-1, may send a query or query prefix to the search engine 130 via the network 120 and receive query suggestions and search results from the search engine 130. The query suggestions can be generated at the spelling correction based search suggestion engine 140, based on the query or query prefix sent by the user 108.

The search engine 130 and the spelling correction based search suggestion engine 140 may access information stored in the knowledge database 155 and the personal database 150 via the network 120. The information in the knowledge database 155 and the personal database 150 may be generated by one or more different applications (not shown), which may be running on the search engine 130, at the backend of the search engine 130, or as a completely standalone system capable of connecting to the network 120, accessing information from different sources, analyzing the information, generating structured information, and storing such generated information in the knowledge database 155 and the personal database 150.

The personal database 150 may include personal data of different users of the search engine 130. For example, personal database 150 may store a contact list and/or search history of each user. Personal data are quite different form web-scale data, because personal data have the following characteristics: data size is usually small; data can be of any type such that words used in personal data can be quite uncommon; score of each entry in personal data, which can be used for ranking, may not be available or may not be helpful if most entries have the same score. The knowledge database 155 may include general knowledge available to public.

The spelling correction based search suggestion engine 140 may generate query suggestions based on a prefix and personal data of a user of the search engine 130. The spelling correction based search suggestion engine 140 can provide spelling corrections based on the personal data without building complicated data models, since personal data are of a small size and could not provide enough training data. In one embodiment, the spelling correction based search suggestion engine 140 may shorten the user's input step by step, then use a simplified candidate evaluation function to evaluate each spelling correction candidate and decide if a spelling correction should be accepted or not. This method not only addresses unique characteristics of personal data, but also provides an efficient way to implement spelling corrected query suggestions in a real-time system.

The content sources 160 in the exemplary networked environment 100 include multiple content sources 160-1, 160-2 . . . 160-3. A content source 160 may correspond to a website hosted by an entity, whether an individual, a business, or an organization such as USPTO.gov, a content provider such as cnn.com and Yahoo.com, a social network website such as Facebook.com, or a content feed source such as tweeter or blogs. The search engine 130 may access information from any of the content sources 160-1, 160-2 . . . 160-3. For example, the search engine 130 may fetch content, e.g., websites, through its web crawler to build a search index.

Figure 2:
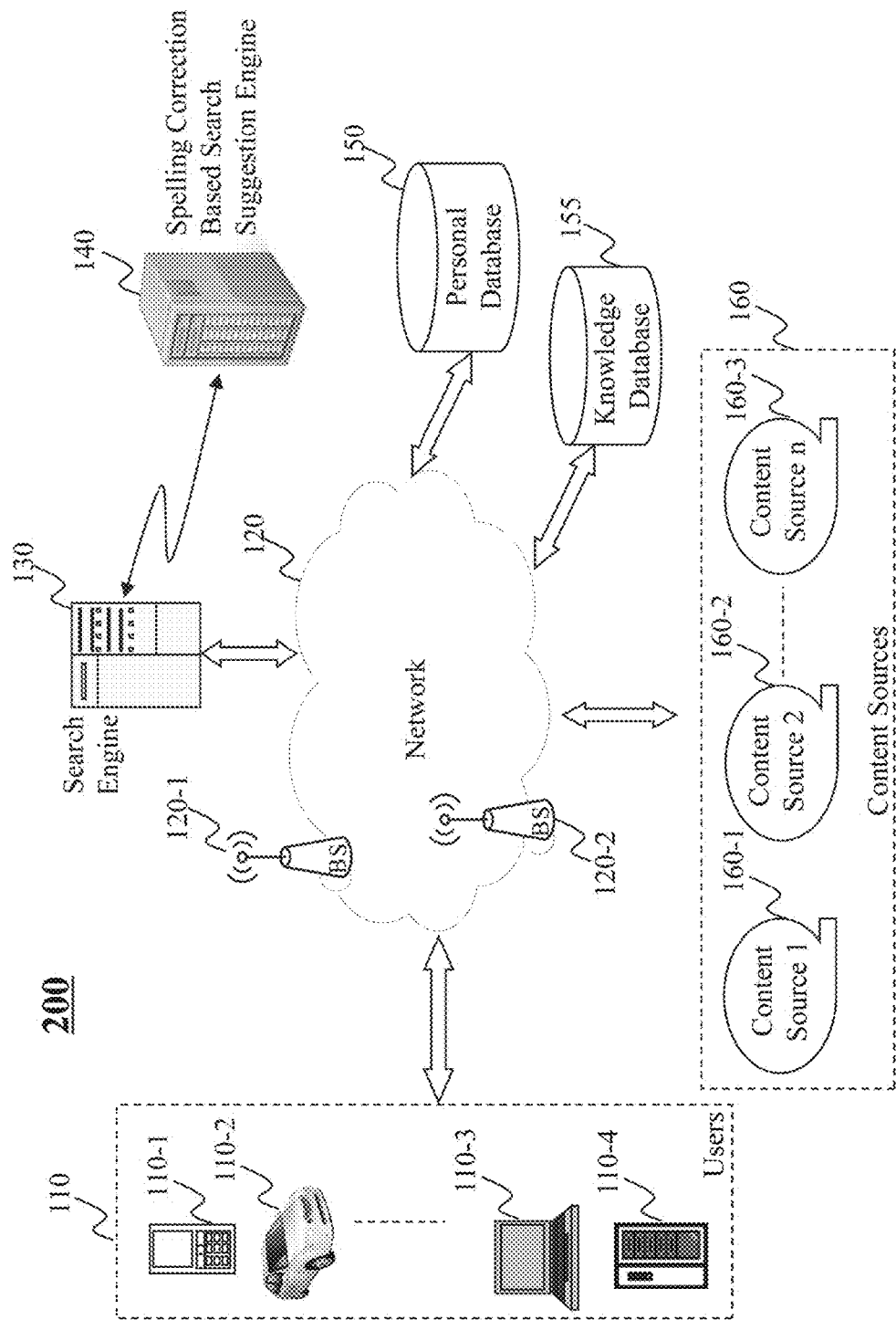
FIG. 2 is a high level depiction of another exemplary networked environment for providing spelling correction based query suggestions, according to an embodiment of the present teaching.

FIG. 2 is a high level depiction of another exemplary networked environment 200 for providing spelling correction based query suggestions, according to an embodiment of the present teaching. The exemplary networked environment 200 in this embodiment is similar to the exemplary networked environment 100 in FIG. 1, except that the spelling correction based search suggestion engine 140 serves as a backend system for the search engine 130.

Figure 3:
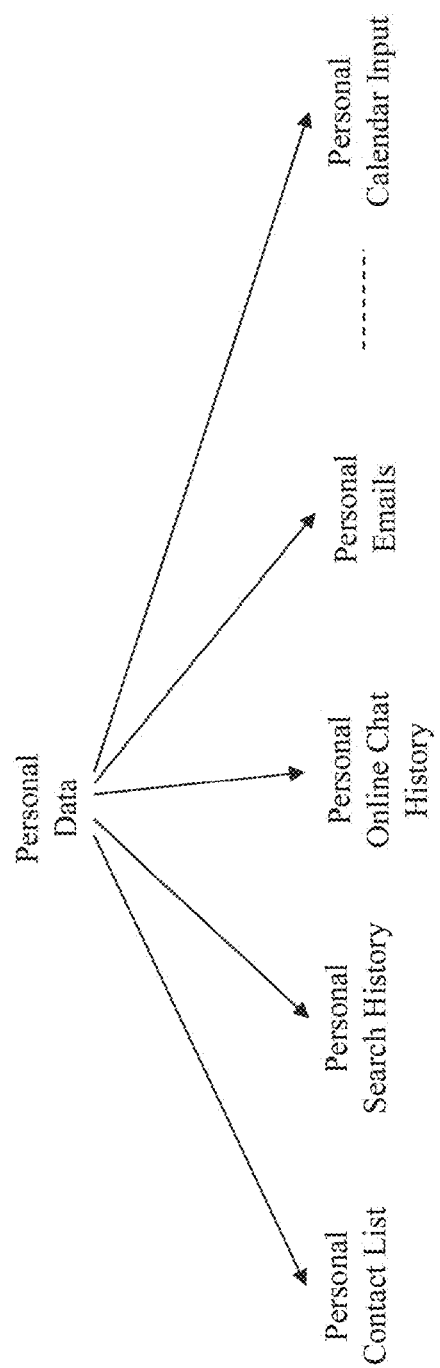
FIG. 3 illustrates exemplary personal data that can be used for spelling correction, according to an embodiment of the present teaching.

FIG. 3 illustrates exemplary personal data that can be used for spelling correction, according to an embodiment of the present teaching. As shown in FIG. 3, personal data of a user may comprise personal contact list of the user, personal search history of the user, personal online chat history of the user, personal emails of the user, personal calendar input of the user, etc. In general, personal data have the following characteristics: data size is usually small; data can be of any type such that words used in personal data can be quite uncommon; score of each entry in personal data, which can be used for ranking, may not be available or may not be helpful if most entries have the same score.

Figure 4:
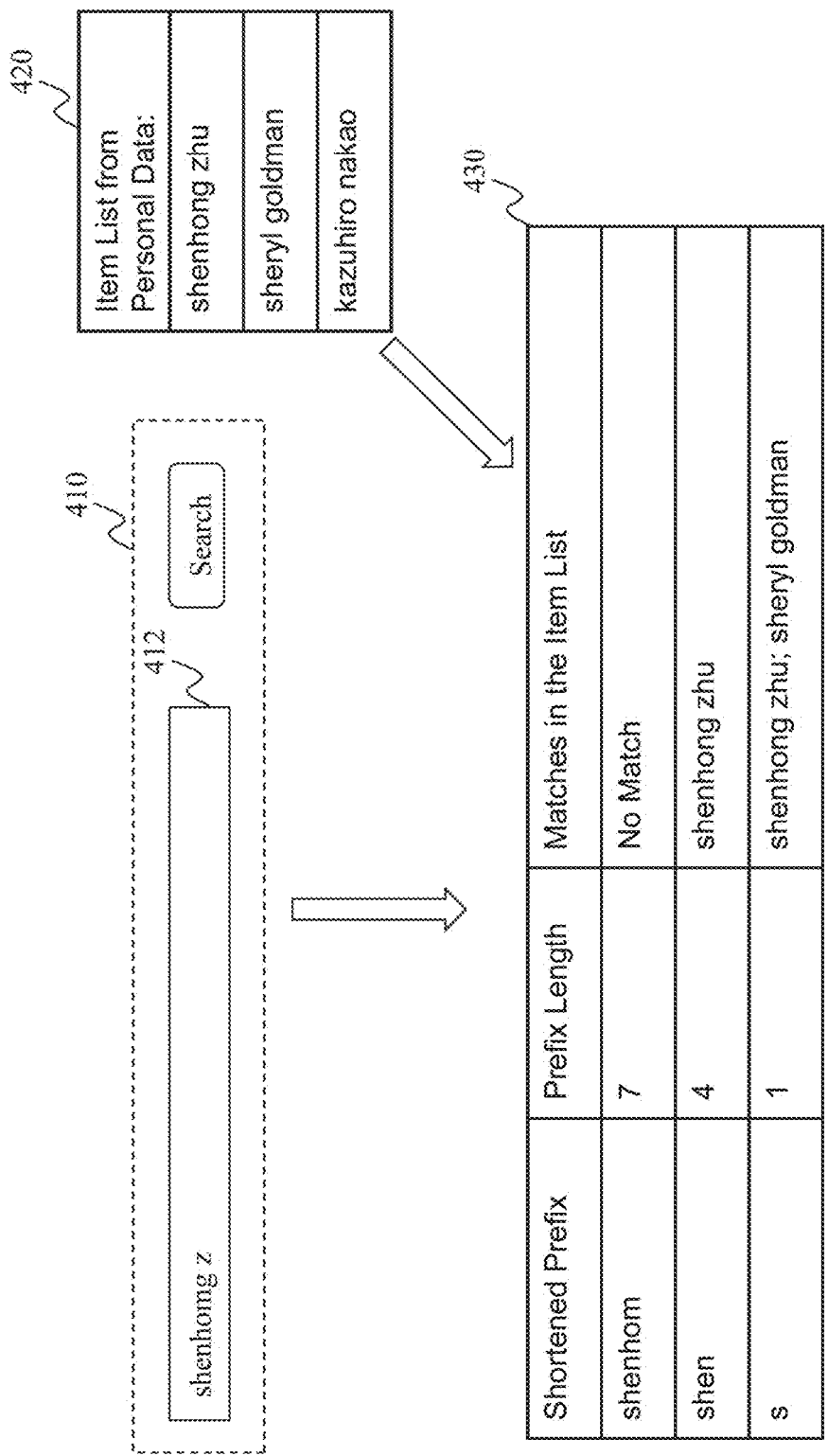
FIG. 4 illustrates comparisons of shortened prefixes and item candidates from personal data for spelling correction, according to an embodiment of the present teaching.

FIG. 4 illustrates comparisons of shortened prefixes and item candidates from personal data for spelling correction, according to an embodiment of the present teaching. As shown in FIG. 4, a user inputs a query prefix "shenhomg z" in a search box 412 on a user interface 410, while a personal database 420 of the user includes three personal contacts: "shenhong zhu", "sheryl goldman" and "kazuhiro nakao". Because there is no match for the prefix "shenhomg z" in the personal database 420, the disclosed system in the present teaching may shorten the prefix by some number of characters in each step as shown in table 430.

The left-most column of the table 430 shows the shortened prefix at each step of prefix-matching. The middle column of the table 430 shows the length of the shortened prefix at each step of prefix-matching. The right-most column of the table 430 shows the matches found in the personal database 420 for each shortened prefix as the result of prefix-matching.

This "shortening method" works for personal data to find spelling correction candidates since personal data is usually much smaller compared to the web-scale data, thus potential matches for each shortened prefix will not be many. In addition, this method can find any type of candidates including very uncommon words/phrases, while conventional spelling correction methods can find only commonly used words/phrases.

The reason why shortening the prefix step by step (i.e., why not shortening to length 1 all at once) is that if one shortens the prefix to only one character at once, it may generate too many matches to evaluate all of them in a limited time window.

In one embodiment, candidate generation will be executed in the following four steps: first, shorten the prefix by N characters (i.e. a step); second, find matches in the personal database using the shortened prefix; third, evaluate each match to test if it is a good spelling correction; and fourth, if enough number of spelling corrections are found, then exit, otherwise, go back to step 1 to find more correction candidates.

N in the above step 1 can be dynamic. For example, when the prefix is long, N can be relatively larger, and when the prefix becomes short, N can be just 1 or 2.

Figure 5:
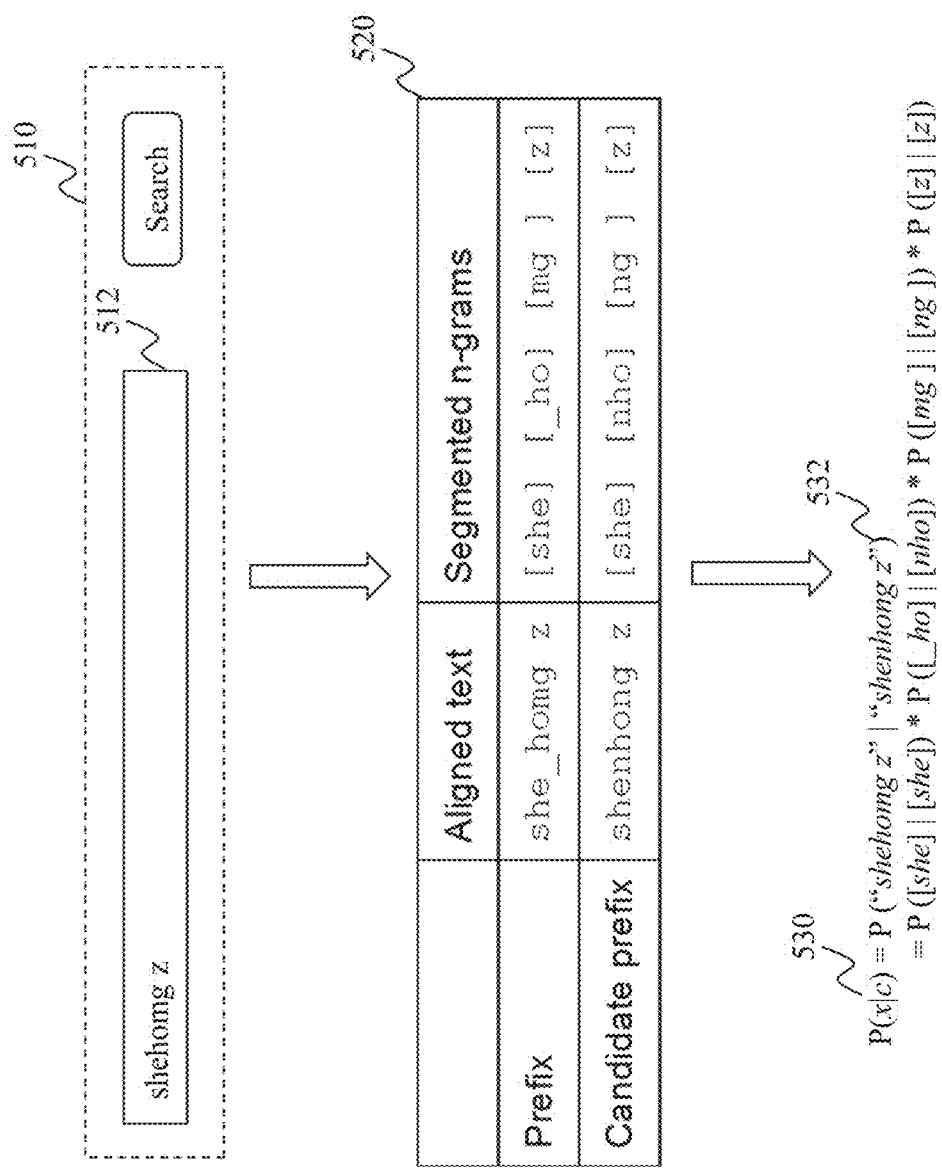
FIG. 5 illustrates a calculation of misspelling likelihood for a user to input a prefix with an original intent of inputting a candidate prefix, according to an embodiment of the present teaching.

FIG. 5 illustrates a calculation of misspelling likelihood for a user to input a misspelled prefix with an original intent of inputting a candidate prefix, according to an embodiment of the present teaching. As shown in FIG. 5, after a user inputs the query prefix "shehomg z" in a search box 512 on a user interface 510, the disclosed system in the present teaching may evaluate different candidates to determine $P(x|c)$ 530 that is a probability of observing the query prefix "x" when the user's original intent is a query candidate "c". It is difficult to build data that directly return the value for, for example, P("shehomg z"|"shenhong zhu") 532, since the system usually do not have enough amount of user's activities (query log, etc) to statistically correctly calculate such data. Even if the system has enough amount of data, it is too costly to build such data for each user.

As such, in one embodiment, the disclosed system may segment both the query prefix and its candidate into sequence of short texts, e.g., character N-grams, and calculate the probability of transformation between the two short strings in each pair. This may be explained below using the example shown in table 520.

As shown in table 520, first, the query prefix ("shehomg z") and the candidate prefix ("shenhong z") are aligned character by character using some standard text alignment algorithm. The character "_" in the query prefix represents a missing character. Then, the aligned two texts are segmented into 3-gram or other N-gram and they are paired.

Then, the disclosed system can calculate the following probability to evaluate a misspelling likelihood for the user to input the prefix "shehomg z" with an original intent of inputting the candidate prefix "shenhong z":

$$P(x|c) = P(\text{"shehomg z"} | \text{"shenhong z"})$$
$$= P([she]|[she]) * P([\_ho]|[nho]) * P([mg]|[ng]) * P([z]|[z])$$

Since there are multiple ways for segmentation, the final probability may be a weighted average of all the probabilities for different segmentations.

General probabilities of text transformation between short texts, e.g., from [nho] to [_ho], can be pre-calculated using web-scale large data since misspellings/mistyping happen mostly the same way regardless of types of target data, thus it does not require to build such probability data for each user's personal data.

Figure 6:
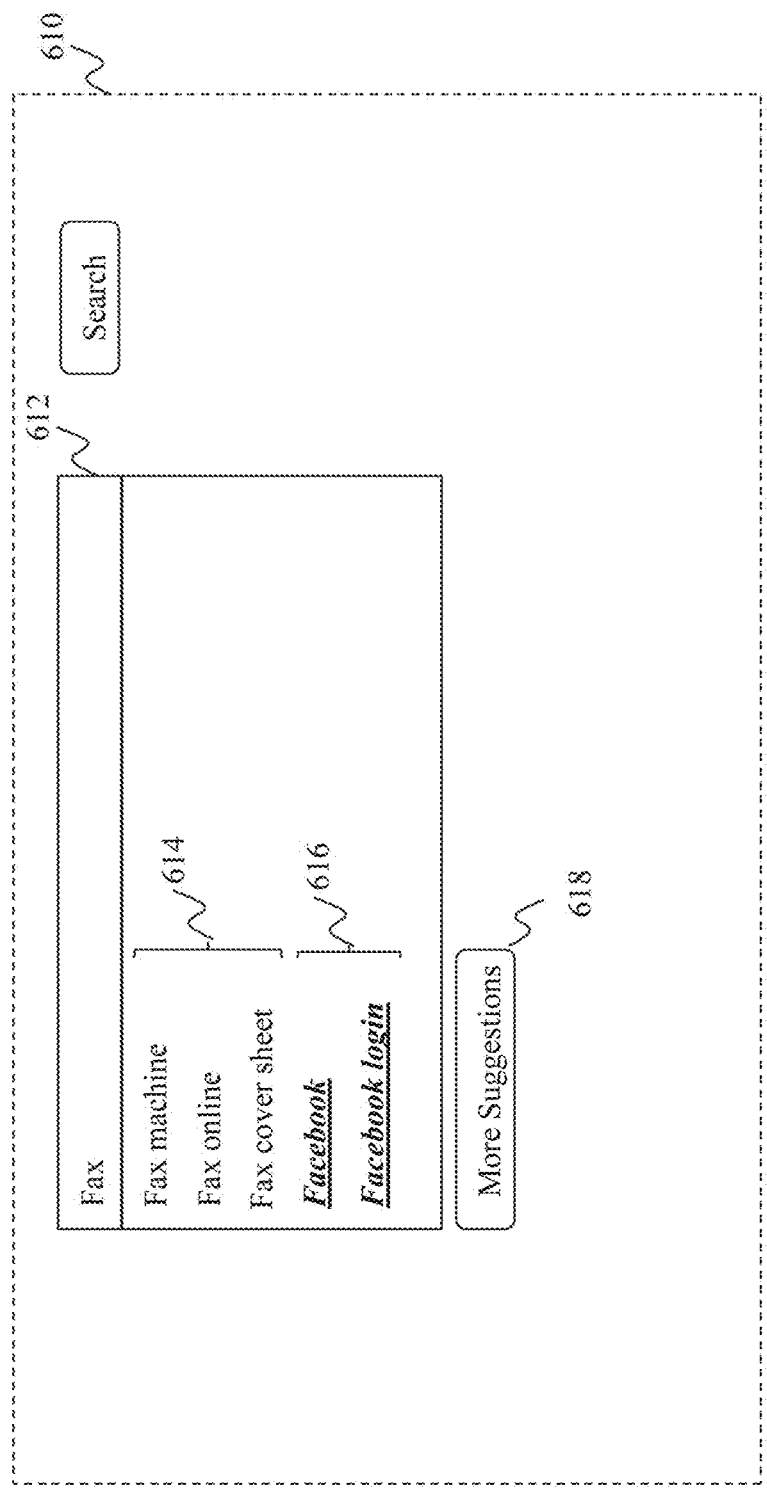
FIG. 6 illustrates a user interface for providing spelling correction based query suggestions, according to an embodiment of the present teaching.

FIG. 6 illustrates a user interface for providing spelling correction based query suggestions, according to an embodiment of the present teaching. As shown in FIG. 6, after a user inputs the query prefix "Fax" in a search box 612 on a user interface 610, the disclosed system may provide various query suggestions to the user.

In one scenario, the disclosed system may determine that there is no spelling error or misspelling in the query prefix "Fax". As such, the disclosed system may provide query suggestions 614 starting with the query prefix "Fax", like "Fax machine", "Fax online", "Fax cover sheet".

In another scenario, the disclosed system may determine that there is a spelling error or misspelling in the query prefix "Fax". As such, the disclosed system may provide spelling corrected query suggestions 616, e.g. "Facebook", "Facebook login". The spelling correction based query suggestions 616 may be provided because the user has visited or searched Facebook frequently before entering the query prefix "Fax", such that "Facebook" instead of "Fax" is stored in a personal database of the user. In addition, "Facebook" may be a better match or be associated with a higher misspelling likelihood than that of other candidates in the personal database, with respect to the query prefix "Fax".

As shown in FIG. 6, the disclosed system may provide both the general knowledge based query suggestions 614 and the spelling correction based query suggestions 616 to the user. The spelling correction based query suggestions 616 may be presented in a different format than that of the knowledge based query suggestions 614, e.g. different font, different style, different font size, etc. In addition, the user may click on the button 618 to see more suggestions, e.g. more spelling correction based query suggestions.

Figure 7:
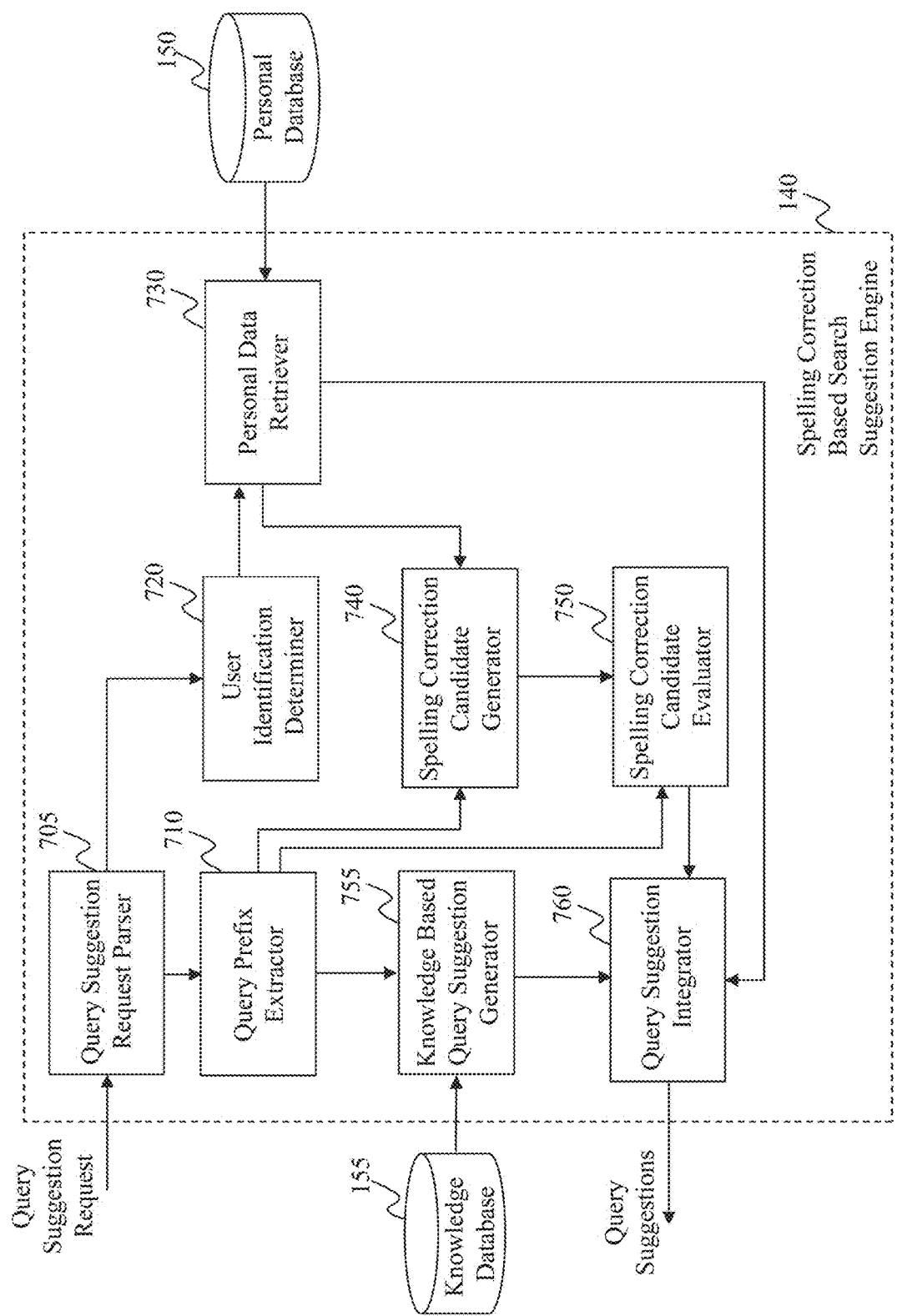
FIG. 7 illustrates an exemplary diagram of a spelling correction based search suggestion engine, according to an embodiment of the present teaching.

FIG. 7 illustrates an exemplary diagram of a spelling correction based search suggestion engine 140, according to an embodiment of the present teaching. The spelling correction based search suggestion engine 140 in this example includes a query suggestion request parser 705, a query prefix extractor 710, a user identification determiner 720, a personal data retriever 730, a spelling correction candidate generator 740, a spelling correction candidate evaluator 750, a knowledge based query suggestion generator 755, and a query suggestion integrator 760.

The query suggestion request parser 705 in this example may receive a request for query suggestions to be provided to a user, either from the search engine 130 or directly from the user's device. The query suggestion request parser 705 may parse the request into different information and send different information to the query prefix extractor 710 for extracting a query prefix and to the user identification determiner 720 for determining a user identification (ID).

The query prefix extractor 710 in this example may receive the parsed request information from the query suggestion request parser 705 and extract a query prefix from the parsed request information. The query prefix might be input by the user for searching online content. The query prefix extractor 710 may forward the query prefix to the spelling correction candidate generator 740 for generating spelling correction candidates, to the spelling correction candidate evaluator 750 for evaluating spelling correction candidates, and to the knowledge based query suggestion generator 755 for generating knowledge based query suggestions.

The user identification determiner 720 in this example may receive the parsed request information from the query suggestion request parser 705 and determine a user ID of the user entering the query prefix. The user identification determiner 720 may send the user ID to the personal data retriever 730 for retrieving personal data.

The personal data retriever 730 in this example may receive the user ID of the user from the user identification determiner 720 and retrieve personal data of the user based on the user ID, from the personal database 150. In one embodiment, the personal database 150 includes personal data for different users of a search engine. In another embodiment, which is not shown, the personal data retriever 730 may retrieve personal data of the user from a personal database specifically associated with the user. The personal data retriever 730 may send the retrieved personal data to the spelling correction candidate generator 740 for generating spelling correction candidates, and to the query suggestion integrator 760 for integrating and ranking various query suggestions. As discussed above, the personal data may include the user's personal contact list, personal search history, personal online chat history, personal emails, and/or personal calendar input.

The spelling correction candidate generator 740 in this example may generate spelling correction candidates based on the query prefix obtained from the query prefix extractor 710 and the personal data obtained from the personal data retriever 730. As discussed above, each spelling correction candidate may be generated based on a match between an item in personal data and a shortened version of the extracted query prefix. The spelling correction candidate generator 740 may send each spelling correction candidate to the spelling correction candidate evaluator 750 for evaluation.

The spelling correction candidate evaluator 750 in this example may evaluate each spelling correction candidate generated by the spelling correction candidate generator 740. In one embodiment, the evaluation may be based on calculation of edit distances and misspelling likelihoods of each spelling correction candidate. Based on the evaluation, the spelling correction candidate evaluator 750 may determine one or more spelling correction based query suggestions each of which is associated with a corresponding misspelling likelihood. Each corresponding misspelling likelihood may represent a degree of likelihood for the user to input the query prefix extracted at the query prefix extractor 710, while the user's original intent was to input the associated spelling correction based query suggestion or a corresponding prefix of the associated spelling correction based query suggestion. The spelling correction candidate evaluator 750 may send the one or more spelling correction based query suggestions and their associated misspelling likelihoods to the query suggestion integrator 760 for integrating and ranking query suggestions.

The knowledge based query suggestion generator 755 in this example may receive the query prefix from the query prefix extractor 710 and generate common knowledge based query suggestions based on the query prefix. The knowledge based query suggestion generator 755 can utilize common knowledge from the knowledge database 155 to determine one or more query suggestions based on the query prefix, with or without assuming there is misspelling in the query prefix. The knowledge based query suggestion generator 755 may send the knowledge based query suggestions to the query suggestion integrator 760 for integrating and ranking query suggestions.

The query suggestion integrator 760 in this example may receive both the knowledge based query suggestions from the knowledge based query suggestion generator 755 and the spelling correction based query suggestions from the spelling correction candidate evaluator 750. The query suggestion integrator 760 may then integrate and rank these query suggestions, e.g. based on personal data of the user, to generate ranked query suggestions. For example, if the user tends to misspell a lot in the past based on the user's personal data, the ranked query suggestions may include more spelling correction based query suggestions than knowledge based query suggestions, and/or may rank the spelling correction based query suggestions higher than knowledge based query suggestions. On the other hand, if the user seldom misspells in the past based on the user's personal data, the ranked query suggestions may include no or less spelling correction based query suggestions than knowledge based query suggestions, and/or may rank the spelling correction based query suggestions lower than knowledge based query suggestions. The query suggestion integrator 760 in this example may provide the ranked query suggestions to the search engine 130 or to the user directly.

Figure 8:
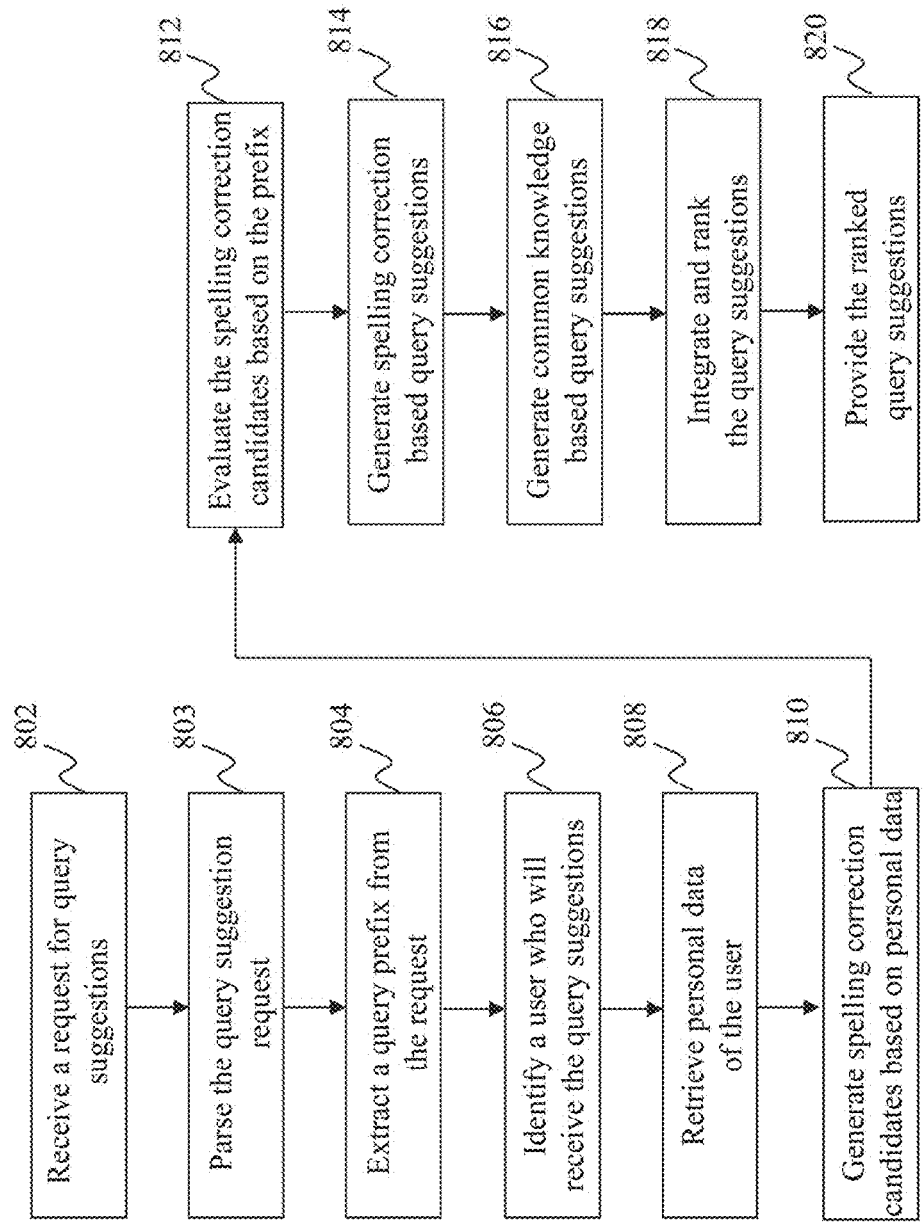
FIG. 8 is a flowchart of an exemplary process performed by a spelling correction based search suggestion engine, according to an embodiment of the present teaching.

FIG. 8 is a flowchart of an exemplary process performed by a spelling correction based search suggestion engine, e.g. the spelling correction based search suggestion engine 140 in FIG. 7, according to an embodiment of the present teaching. A request is received at 802 for query suggestions. The query suggestion request is parsed at 803. At 804, a query prefix is extracted from the request. A user ID is determined at 806 for the user who will receive the query suggestions in response to the request. Personal data of the user are retrieved at 808.

Spelling correction candidates are generated at 810 based on the personal data. The spelling correction candidates are evaluated at 812 based on the query prefix. At 814, one or more spelling correction based query suggestions are generated. Common knowledge based query suggestions are generated at 816. The query suggestions are integrated and ranked at 818 to generate ranked query suggestions. At 820, the ranked query suggestions are provided in response to the request.

Figure 9:
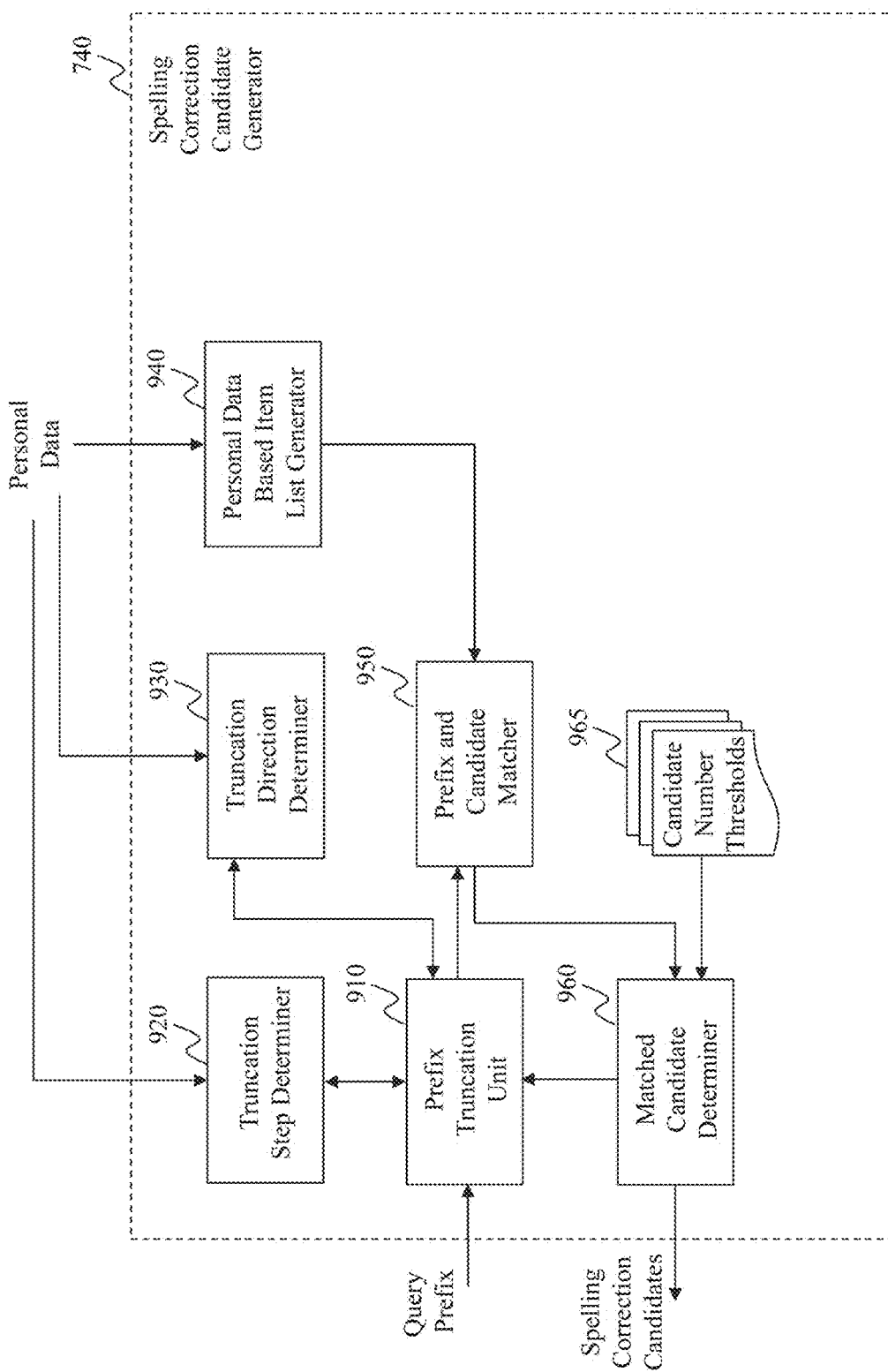
FIG. 9 illustrates an exemplary diagram of a spelling correction candidate generator, according to an embodiment of the present teaching.

FIG. 9 illustrates an exemplary diagram of a spelling correction candidate generator 740, according to an embodiment of the present teaching. As shown in FIG. 9, the spelling correction candidate generator 740 in this example includes a prefix truncation unit 910, a truncation step determiner 920, a truncation direction determiner 930, a personal data based item list generator 940, a prefix and candidate matcher 950, a matched candidate determiner 960, and candidate number thresholds 965.

The prefix truncation unit 910 in this example may obtain a query prefix submitted by a user, e.g. from the query prefix extractor 710 in FIG. 7. The prefix truncation unit 910 may truncate the query prefix with a truncation step and a truncation direction. A truncation direction can determine to which direction the prefix is truncated, e.g. from left to right or from right to left. While the truncation or shortening shown in FIG. 4 is based on a truncation direction of right to left, a different truncation direction of left to right may be utilized in another embodiment. A truncation step can determine the number of characters being truncated at each time of shortening. For example, the truncation step in FIG. 4 is 3, as each time when the prefix is shortened, its length is reduced by 3.

The prefix truncation unit 910 may inform the truncation step determiner 920 to determine a truncation step for the truncation. The truncation step determiner 920 in this example may obtain personal data of the user and determine the truncation step based on the personal data. For example, when personal data is large, the truncation step can be relatively smaller to avoid too many candidates at a time. For example, when the prefix is long, the truncation step can be relatively larger, and when the prefix becomes short, the truncation step can be just 1 or 2.

The prefix truncation unit 910 may inform the truncation direction determiner 930 to determine a truncation direction for the truncation. The truncation direction determiner 930 in this example may obtain personal data of the user and determine the truncation direction based on the personal data. For example, if more matches were found with respect to one direction for the user based on the personal data of the user, the direction may be used as the truncation direction.

Each time after the prefix truncation unit 910 truncates the prefix to generate a shortened prefix, the prefix truncation unit 910 may send the shortened prefix to the prefix and candidate matcher 950 for prefix matching.

The personal data based item list generator 940 in this example may generate a list of items based on personal data of the user. Each item in the list can be a candidate for matching with the shortened prefix at the prefix and candidate matcher 950. The personal data based item list generator 940 may send the item candidate list to the prefix and candidate matcher 950 for prefix matching.

The prefix and candidate matcher 950 in this example may receive each shortened prefix from the prefix truncation unit 910 and match the shortened prefix with item candidates in the item list generated by the personal data based item list generator 940. The prefix and candidate matcher 950 may send the matching result to the matched candidate determiner 960.

The matched candidate determiner 960 in this example may receive the matching result from the prefix and candidate matcher 950 and determine one or more matched candidates based on the matching result. In one embodiment, the matched candidate determiner 960 may determine that there is no matched candidate based on a matching result received from the prefix and candidate matcher 950. The matched candidate determiner 960 in this example may select a candidate number threshold Tc from the candidate number thresholds 965, and utilize this candidate number threshold Tc to determine whether there are enough matched candidates. In one situation, when the matched candidate determiner 960 determines that the number of total matched candidates reaches Tc, the matched candidate determiner 960 may send all matched candidates for evaluation. The matched candidates are spelling correction candidates to be evaluated. In another situation, when the matched candidate determiner 960 determines that the number of total matched candidates does not reach Tc, the matched candidate determiner 960 may send inform the prefix truncation unit 910 to further truncate the prefix to generate a further shortened prefix. In one embodiment, the matched candidate determiner 960 may select one of the candidate number thresholds 965 based on personal data of the user, e.g. searching history of the user.

In one embodiment, the prefix truncation unit 910 will further truncate the prefix based on the truncation step and the truncation direction that were used from the previous truncation for the same query prefix. In another embodiment, the prefix truncation unit 910 will further truncate the prefix based on a new truncation step determined by the truncation step determiner 920 and/or a new truncation direction determined by the truncation direction determiner 930.

It can be understood that for a new query prefix, the prefix truncation unit 910 may first forward the entire prefix to the prefix and candidate matcher 950 for prefix matching before truncating the prefix. If the matched candidate determiner 960 determines that the number of matched candidates for the entire prefix already reaches the candidate number threshold, the matched candidate determiner 960 will send the matched candidates for evaluation. In this special case, there is no misspelling in the prefix.

Figure 10:
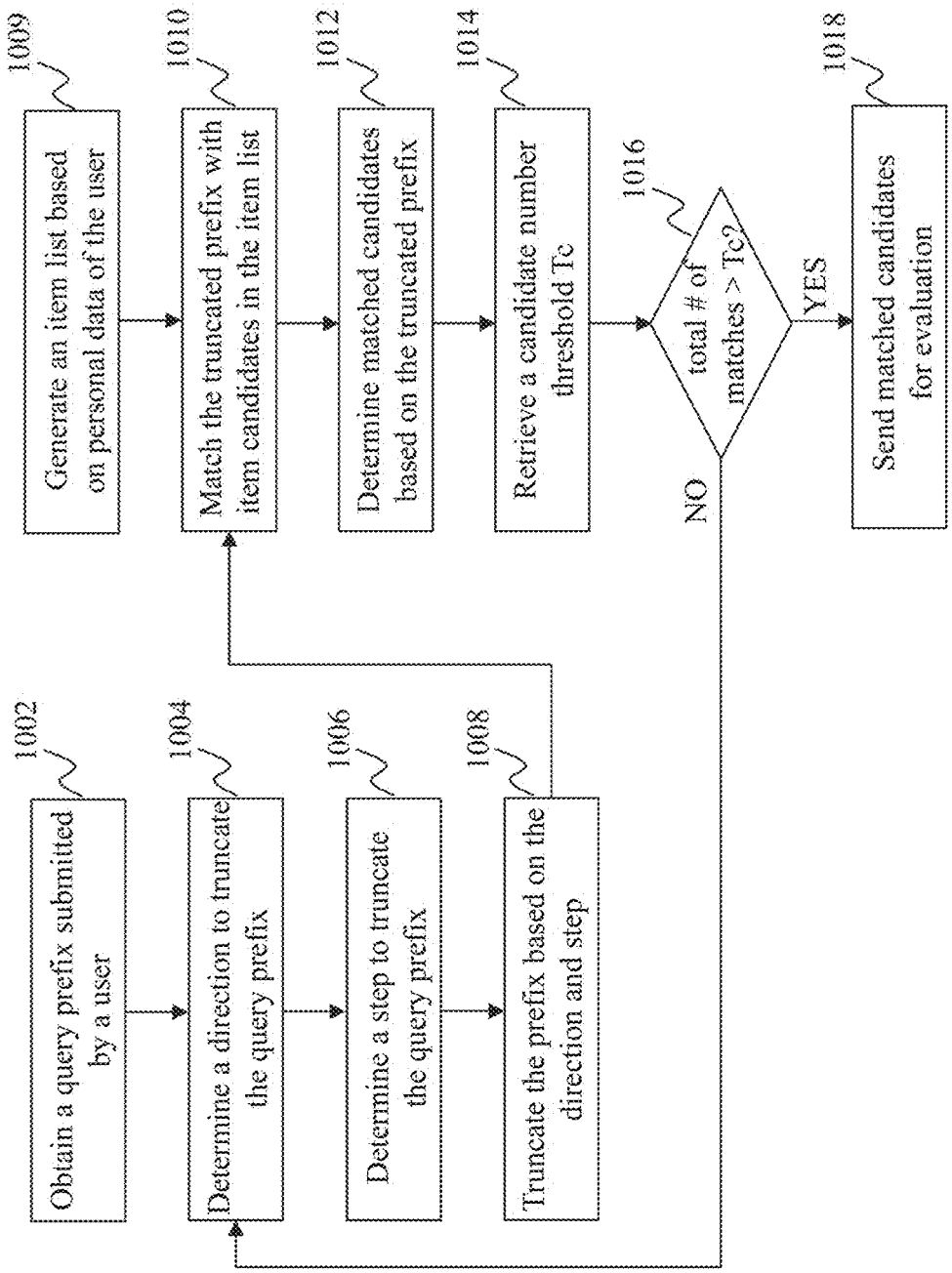
FIG. 10 is a flowchart of an exemplary process performed by a spelling correction candidate generator, according to an embodiment of the present teaching.

FIG. 10 is a flowchart of an exemplary process performed by a spelling correction candidate generator, e.g. the spelling correction candidate generator 740 in FIG. 9, according to an embodiment of the present teaching. A query prefix submitted by a user is obtained at 1002. A direction to truncate the query prefix is determined at 1004. A step to truncate the query prefix is determined at 1006. The prefix is truncated at 1008 based on the direction and the step. The process may then move to 1010.

An item list is generated at 1009 based on personal data of the user. The process may then move to 1010. At 1010, the truncated prefix is matched with item candidates in the item list. One or more matched candidates may be determined at 1012 based on the truncated prefix. A candidate number threshold Tc is retrieved at 1014.

At 1016, it is determined whether the total number of matched candidates so far for the prefix has reached the candidate number threshold Tc. If so, the process moves on to 1018, where the matched spelling correction candidates are sent for evaluation. Otherwise, the process goes back to 1004.

Figure 11:
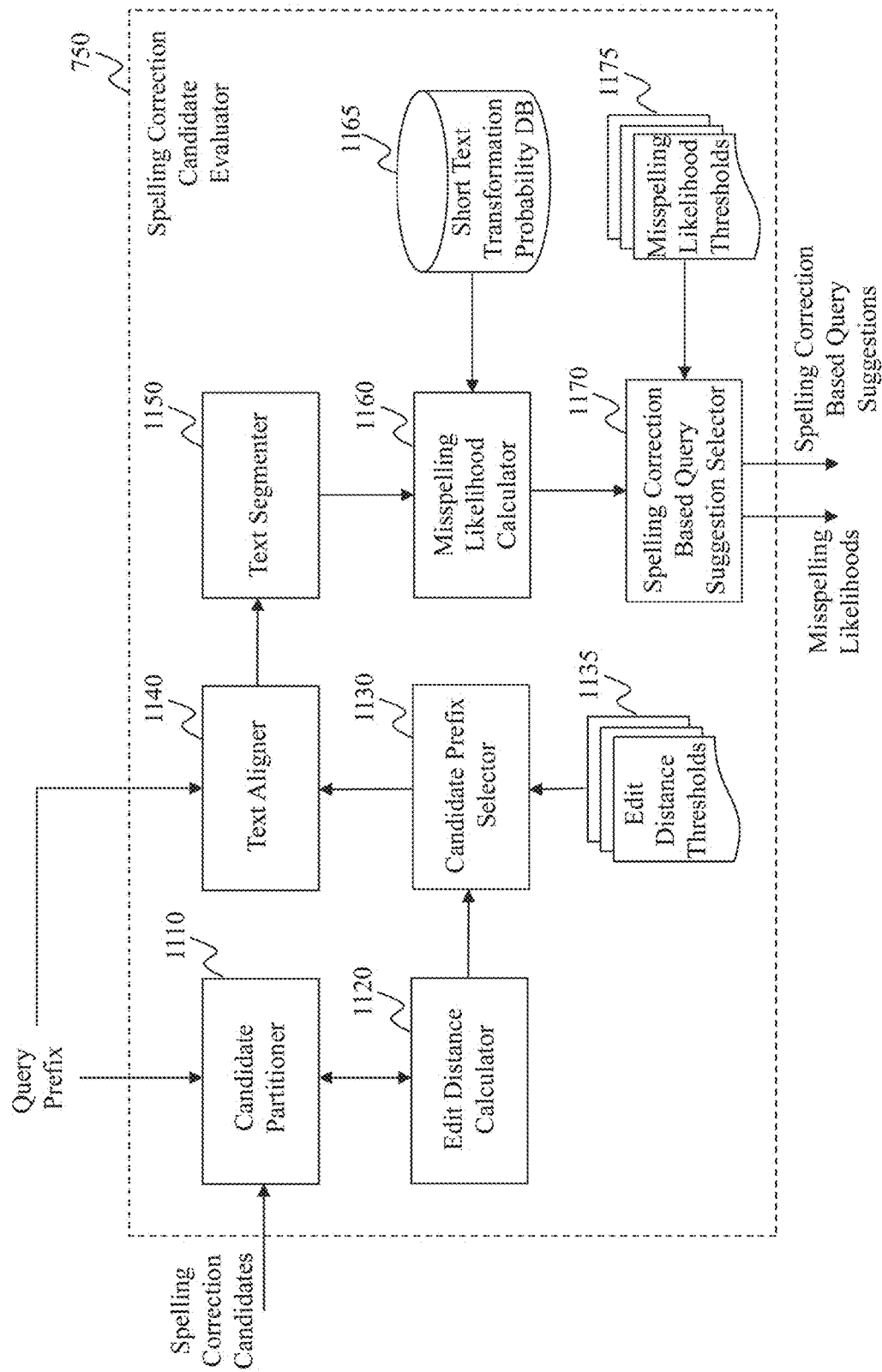
FIG. 11 illustrates an exemplary diagram of a spelling correction candidate evaluator, according to an embodiment of the present teaching.

FIG. 11 illustrates an exemplary diagram of a spelling correction candidate evaluator 750, according to an embodiment of the present teaching. As shown in FIG. 11, the spelling correction candidate evaluator 750 in this example includes a candidate partitioner 1110, an edit distance calculator 1120, a candidate prefix selector 1130, edit distance thresholds 1135, a text aligner 1140, a text segmenter 1150, a misspelling likelihood calculator 1160, a short text transformation probability database 1165, a spelling correction based query suggestion selector 1170, and misspelling likelihood thresholds 1175.

A formula that can be used for evaluation of each spelling correction candidate is that: for a misspelled word x, find the correct word c satisfying:

$$\operatorname{argmax}_c P(c|x) = \operatorname{argmax}_c P(x|c)P(c)/P(x) = \operatorname{argmax}_c P(x|c)P(c)$$

where P(c) is a prior probability and it means "the more popular a candidate is, the more likely the candidate is the expected spelling correction for the user". To calculate P(c), language model (or similar data) is typically used. P(x|c) is the probability of observing the query x when the user's original intent is query c. In other words, it shows how similar a spelling correction candidate is to the user's prefix.

Language model (or similar data) used to calculate P(c) needs to be built from the data of the target domain, i.e., each user's personal data in this case. As mentioned above, it is quite costly to build language model data for each user and it may not help the evaluation process. As such, the disclosed system may simply omit P(c) and use only P(x|c) for evaluation of each spelling correction candidate.

In one embodiment, the spelling correction candidate evaluator 750 may perform an evaluation for each spelling correction candidate in three steps: first, calculate an edit distance between the spelling correction candidate and the query prefix; second, calculate P(x|c) where x is the query prefix and c is the spelling correction candidate; and third, decide if the spelling correction candidate should be accepted. The details of the three steps will be described referring to FIG. 11.

The candidate partitioner 1110 in this example may obtain a query prefix and one or more spelling correction candidates generated based on the query prefix. The candidate partitioner 1110 may then partition each candidate to generate candidate prefixes. For each candidate prefix, the candidate partitioner 1110 in this example may send the candidate prefix to the edit distance calculator 1120 for calculating an edit distance between the candidate prefix and the query prefix.

An edit distance may be utilized to discard candidates that are obviously not spelling correction. For an edit distance calculation, prefix and a part of spelling correction candidate that corresponds to the prefix ("candidate prefix") are used. For example, for prefix "shehomg z", a part of spelling correction candidate that corresponds to the prefix can be:

"shenhong" with the same length as the prefix or "shenhong z" having the length equal to prefix length+1.

In one embodiment, the disclosed system in the present teaching may use whichever candidate prefix that gives a smaller edit distance compared to the query prefix. An edit distance between a candidate prefix and the query prefix may be represented by the minimum number of edits (deleting a character, inserting a character, swapping a character with another, etc.) on the candidate prefix to make the candidate prefix the same as the query prefix. In this example, relative to the query prefix "shehomg z", "shenhong" has an edit distance 3 while "shenhong z" has an edit distance 2, such that the system will use "shenhong z" for candidate evaluation.

Referring to FIG. 11, based on a received query prefix "shehomg z", the candidate partitioner 1110 may partition the spelling correction candidate "shenhong zhu" to generate two candidate prefixes "shenhong" and "shenhong z", and send them to the edit distance calculator 1120. The edit distance calculator 1120 in this example may calculate an edit distance between each candidate prefix and the query prefix. For each spelling correction candidate, the edit distance calculator 1120 may determine a candidate prefix that has the smallest edit distance compared to the query prefix, among all possible candidate prefixes partitioned from the spelling correction candidate. In the above example, the edit distance calculator 1120 will determine the candidate prefix "shenhong z" for further evaluation. The edit distance calculator 1120 may then send the determined candidate prefixes for the spelling correction candidates to the candidate prefix selector 1130 for selection.

The candidate prefix selector 1130 in this example may receive multiple candidate prefixes corresponding to multiple spelling correction candidates with respect to the query prefix. The candidate prefix selector 1130 may retrieve one of the edit distance thresholds 1135 and select one or more candidate prefixes from the multiple received candidate prefixes based on the retrieved edit distance threshold. The edit distance threshold may be pre-set based on some empirical study. In one example, the edit distance threshold may specify that the selected candidate prefix must have an edit distance<=5. In another example, the edit distance threshold may specify that the selected candidate prefix must satisfy that: edit-distance/prefix-length<0.34. After selecting the one or more candidate prefixes based on the edit distance threshold, the candidate prefix selector 1130 may send the selected candidate prefixes to the text aligner 1140 for text alignment.

The text aligner 1140 in this example may receive the selected candidate prefixes from the candidate prefix selector 1130 and align the text between the query prefix and each selected candidate prefix. For example, as shown in FIG. 5, the query prefix ("shehomg z") and the candidate prefix ("shenhong z") are aligned character by character using some text alignment algorithm. The character "_" in the query prefix represents a missing character. The text aligner 1140 may send each pair of the aligned query prefix and corresponding candidate prefix to the text segmenter 1150 for text segmentation.

The text segmenter 1150 in this example may receive different pairs of aligned (query prefix: candidate prefix), and segment the text of the query prefix and corresponding selected candidate prefix. For example, as shown in FIG. 5, the aligned two texts "she_homg z" and "shenhong z" are segmented into 3-grams and the 3-grams are paired. After segmentation, the text segmenter 1150 may send the paired short texts (e.g. N-grams) to the misspelling likelihood calculator 1160 for misspelling likelihood calculation.

The misspelling likelihood calculator 1160 in this example may calculate a misspelling likelihood for each pair of aligned (query prefix: candidate prefix). In one embodiment, the misspelling likelihood calculator 1160 may calculate the following probability to evaluate a misspelling likelihood for the user to input the query prefix ("shehomg z") with an original intent of inputting the candidate prefix ("shenhong z"):

$$P(x\,|\,c) = P(\text{``shehomg z''}\,|\,\text{``shenhong z''})$$
$$= P([she]\,|\,[she]) * P([\_ho]\,|\,[nho]) * P([mg]\,|\,[ng]) * P([z]\,|\,[z])$$

Since there can be multiple ways for segmentation of the (query prefix: candidate prefix) pair, the final probability or misspelling likelihood calculated by the misspelling likelihood calculator 1160 for the pair may be a weighted average of all the probabilities for different segmentations generated by the text segmenter 1150.

General probabilities of text transformation between short texts, e.g., from [nho] to [_ho], can be pre-calculated using web-scale large data since misspellings/mistyping happen mostly the same way regardless of types of target data, and stored in the short text transformation probability database 1165. As such, the misspelling likelihood calculator 1160 may retrieve the pre-calculated short text transformation probabilities from the short text transformation probability database 1165, without building probability data for each user's personal data. After calculating the misspelling likelihoods, the misspelling likelihood calculator 1160 may send the misspelling likelihood for each corresponding spelling correction candidate to the spelling correction based query suggestion selector 1170 for spelling correction based query suggestion selection.

The spelling correction based query suggestion selector 1170 in this example may retrieve one of the misspelling likelihood thresholds 1175 and select one or more spelling correction based query suggestions based on the retrieved misspelling likelihood threshold and the misspelling likelihoods received from the misspelling likelihood calculator 1160. In one example, the spelling correction based query suggestion selector 1170 may select all spelling correction candidates having misspelling likelihoods larger than a threshold, e.g. 0.6, as the spelling correction based query suggestions. In another example, the spelling correction based query suggestion selector 1170 may select the top K spelling correction candidates, after ranking the spelling correction candidates according to their respective misspelling likelihoods, as the spelling correction based query suggestions. The misspelling likelihood threshold can be a constant or can be dynamic. For example, one can set a higher misspelling likelihood threshold for a shorter prefix to achieve better precision.

It can be understood that in one embodiment, some of the spelling correction candidates received by the candidate partitioner 1110 are filtered out by the edit distance threshold at the candidate prefix selector 1130, while some of the spelling correction candidates received by the candidate partitioner 1110 are filtered out by the misspelling likelihood threshold at the spelling correction based query suggestion selector 1170.

The spelling correction based query suggestion selector 1170 may send the selected spelling correction based query suggestions, together with their respective misspelling likelihoods, to the query suggestion integrator 760 for query suggestion integration.

Figure 12:
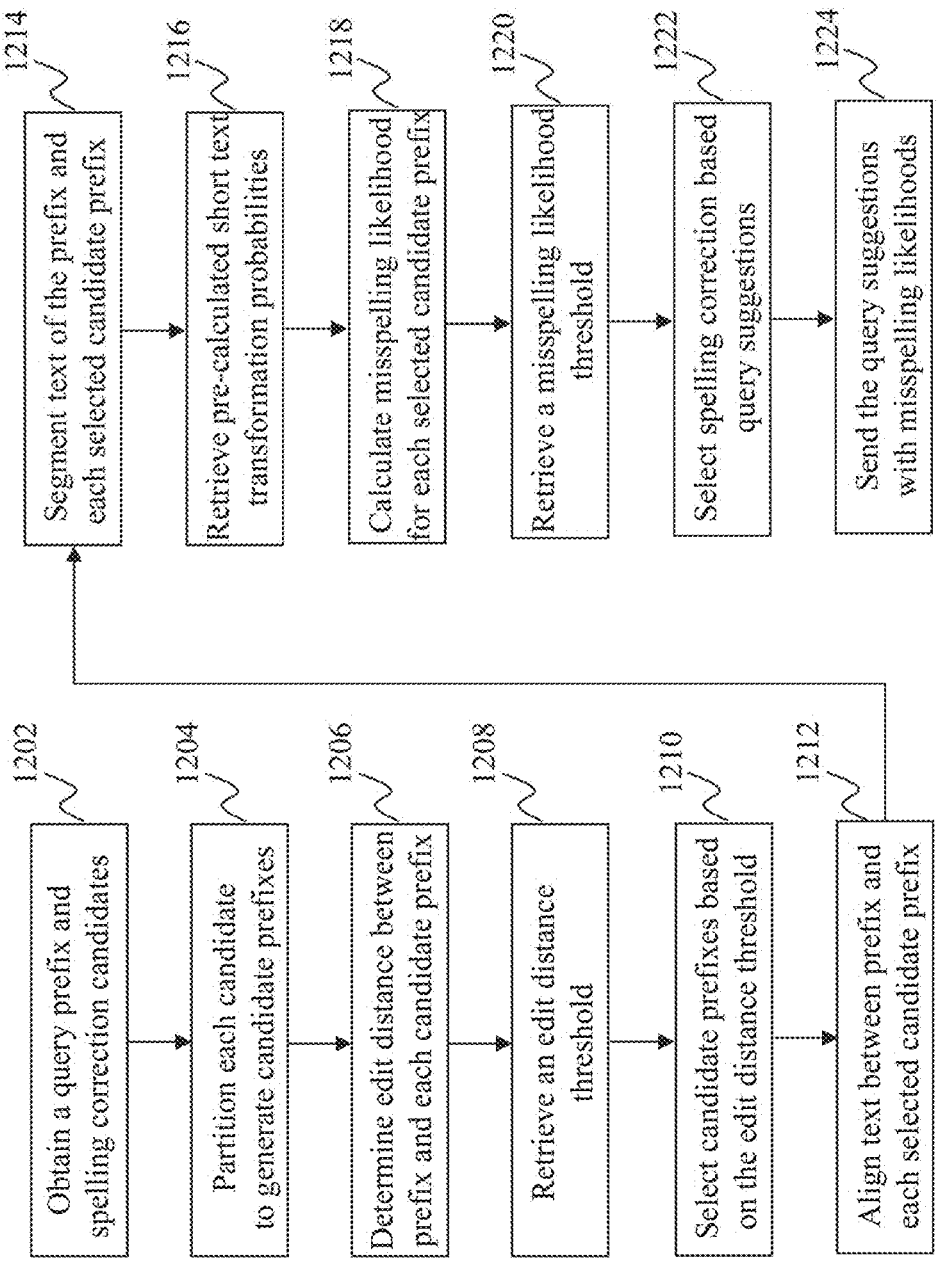
FIG. 12 is a flowchart of an exemplary process performed by a spelling correction candidate evaluator, according to an embodiment of the present teaching.

FIG. 12 is a flowchart of an exemplary process performed by a spelling correction candidate evaluator, e.g. the spelling correction candidate evaluator 750 in FIG. 11, according to an embodiment of the present teaching. A query prefix and its corresponding spelling correction candidates are obtained at 1202. Each candidate is partitioned at 1204 to generate candidate prefixes. At 1206, an edit distance between the query prefix and each candidate prefix is determined. An edit distance threshold is retrieved at 1208. Candidate prefixes are selected at 1210 based on the edit distance threshold. Texts are aligned at 1212 between the query prefix and each selected candidate prefix.

At 1214, texts of the query prefix and each selected candidate prefix are segmented and paired. Pre-calculated short text transformation probabilities are retrieved at 1216. Misspelling likelihood is calculated at 1218 for each selected candidate prefix. A misspelling likelihood threshold is retrieved at 1220. One or more spelling correction based query suggestions are selected at 1222. The one or more selected spelling correction based query suggestions are sent at 1224 together with their respective misspelling likelihoods for query suggestion integration.

Figure 13:
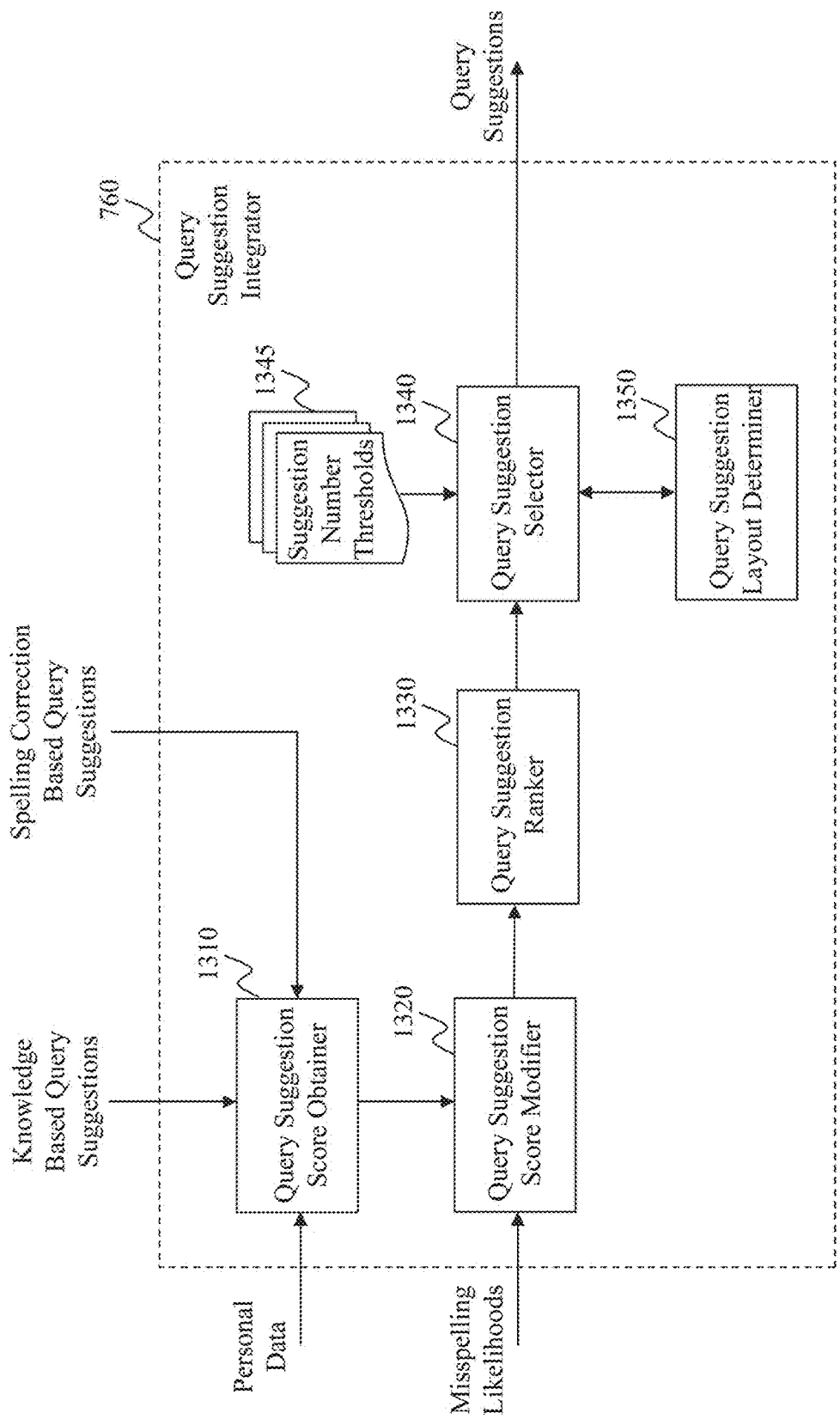
FIG. 13 illustrates an exemplary diagram of a query suggestion integrator, according to an embodiment of the present teaching.

FIG. 13 illustrates an exemplary diagram of a query suggestion integrator 760, according to an embodiment of the present teaching. As shown in FIG. 13, the query suggestion integrator 760 in this example includes a query suggestion score obtainer 1310, a query suggestion score modifier 1320, a query suggestion ranker 1330, a query suggestion selector 1340, a query suggestion layout determiner 1350, and suggestion number thresholds 1345.

The query suggestion score obtainer 1310 in this example may obtain personal data of the user and candidate query suggestions generated based on query prefix submitted by the user. The candidate query suggestions may include both knowledge based candidate query suggestions and spelling correction based candidate query suggestions. For each of the candidate query suggestions, the query suggestion score obtainer 1310 may determine a score based on the personal data. In one example, the score may be pre-stored in the personal data of the user, wherein the score may be pre-generated based on the user's historical online activities. In another example, the score may be generated by the query suggestion score obtainer 1310 based on the personal data of the user, with respect to each of the candidate query suggestions. The query suggestion score obtainer 1310 may send the scores of the candidate query suggestions to the query suggestion score modifier 1320 for score modification.

The query suggestion score modifier 1320 in this example may receive misspelling likelihoods associated with the candidate query suggestions. In general, if a user's personal data has scores for each entry or suggestion, one can use the probability P(x|c) to adjust the score of a suggestion/entry found as a result of spelling correction to better rank it along with other suggestions found by the original user's prefix. The query suggestion score modifier 1320 in this example may modify the scores for spelling correction based candidate query suggestions, based on their respective misspelling likelihoods. For example, a modified score for a spelling correction based candidate query suggestion may be calculated based on a product of its original score and its associated misspelling likelihood. The query suggestion score modifier 1320 may send all candidate query suggestions together with their scores, modified or unmodified, to the query suggestion ranker 1330 for ranking the candidate query suggestions.

The query suggestion ranker 1330 in this example may receive all candidate query suggestions together with their associated scores (modified or unmodified), and rank the candidate query suggestions based on their respective associated scores. The query suggestion ranker 1330 may then send the ranked candidate query suggestions to the query suggestion selector 1340, together with their scores. In one embodiment, the query suggestion ranker 1330 may rank the knowledge based candidate query suggestions and spelling correction based candidate query suggestions separately into two ranked lists, and send them to the query suggestion selector 1340 for selection.

The query suggestion selector 1340 in this example may receive the ranked candidate query suggestions together with their scores and select one or more query suggestions from the ranked candidate query suggestions. In one embodiment, the query suggestion selector 1340 may retrieve one of the suggestion number thresholds 1345 and select the one or more query suggestions based on the suggestion number threshold. In one example, when the suggestion number threshold equals Ts, the query suggestion selector 1340 may select the top Ts query suggestions from the ranked candidate query suggestions to be provided to the user. In another example, the query suggestion selector 1340 may retrieve two suggestion number thresholds, Tk for knowledge based query suggestions and Ts for spelling correction based query suggestions. Then the query suggestion selector 1340 may select the top Tk knowledge based query suggestions and the top Ts spelling correction based query suggestions from the ranked candidate query suggestions or two ranked lists as described above.

In one embodiment, the query suggestion selector 1340 may inform the query suggestion layout determiner 1350 to determine a layout for the selected query suggestions. The query suggestion layout determiner 1350 in this example may determine how to present the selected query suggestions on a user interface. For example, the query suggestion layout determiner 1350 may determine the formats, e.g. font, style, font size, color, etc., for presenting each of the selected query suggestions. In one embodiment, the query suggestion layout determiner 1350 may determine that the selected spelling correction based query suggestions are to be presented in a different format than that of the selected knowledge based query suggestions. The query suggestion layout determiner 1350 may send an instruction about the query suggestion layout to the query suggestion selector 1340. The query suggestion selector 1340 may provide the selected query suggestions, together with the layout instruction for presenting the selected query suggestions, in response to the query suggestion request.

Figure 14:
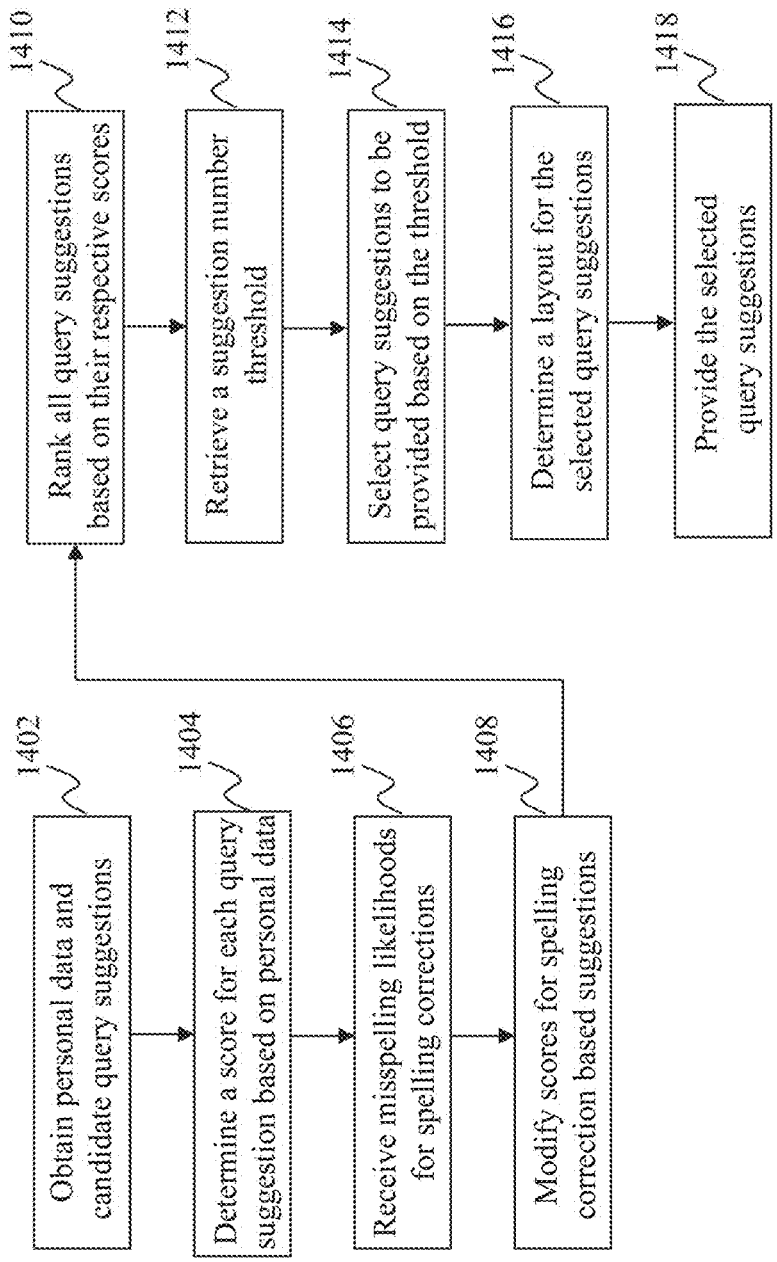
FIG. 14 is a flowchart of an exemplary process performed by a query suggestion integrator, according to an embodiment of the present teaching.

FIG. 14 is a flowchart of an exemplary process performed by a query suggestion integrator, e.g. the query suggestion integrator 760 in FIG. 13, according to an embodiment of the present teaching. Personal data and candidate query suggestions are obtained at 1402. A score is determined at 1404 for each candidate query suggestion based on the personal data. Misspelling likelihoods are received at 1406 for spelling corrections. Scores are modified at 1408 for spelling correction based candidate query suggestions.

At 1410, all candidate query suggestions are ranked based on their respective scores. A suggestion number threshold is retrieved at 1412. Query suggestions are selected at 1414 to be provided based on the threshold. A layout is determined at 1416 for the selected query suggestions. At 1418, the selected query suggestions are provided in response to the original request for query suggestions.

It can be understood that the order of the steps shown in FIG. 8, FIG. 10, FIG. 12, and FIG. 14 may be changed according to different embodiments of the present teaching.

Figure 15:
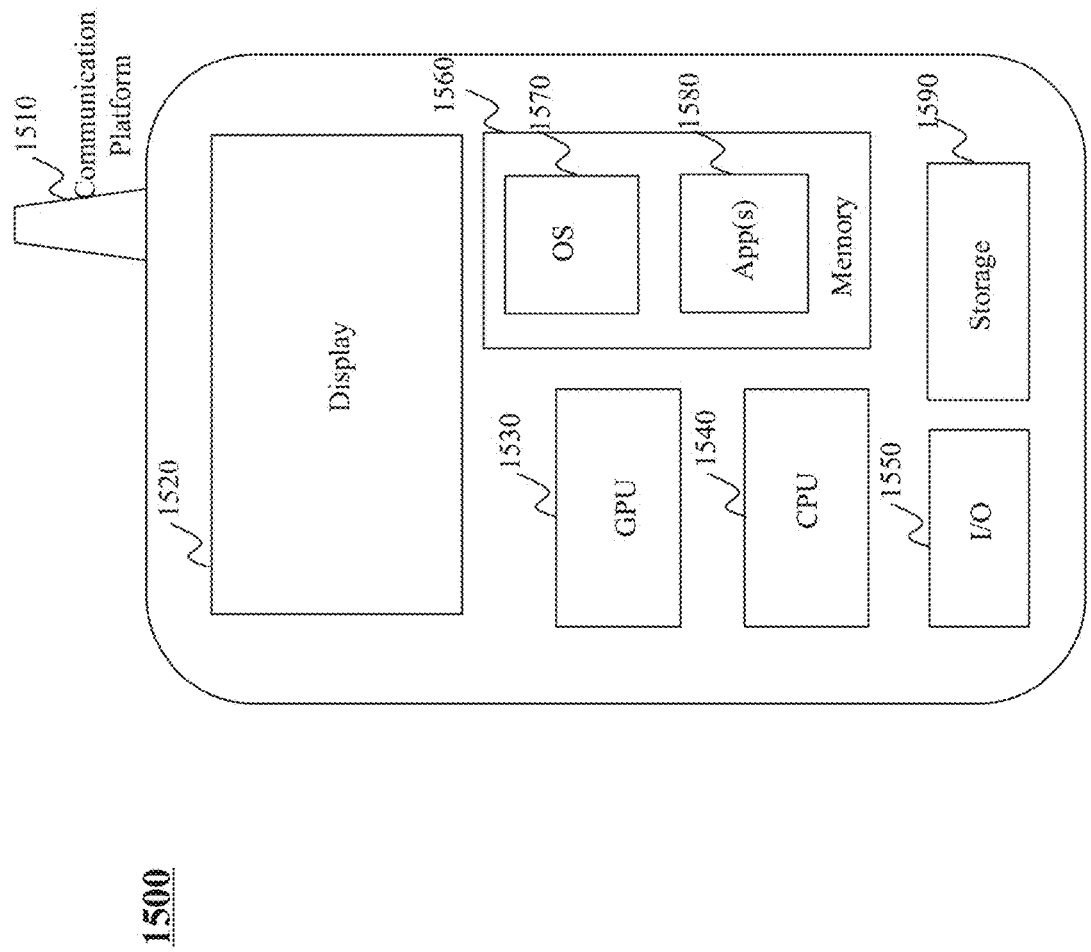
FIG. 15 depicts the architecture of a mobile device which can be used to implement a specialized system incorporating the present teaching.

FIG. 15 depicts the architecture of a mobile device which can be used to realize a specialized system implementing the present teaching. In this example, the user device on which a search result or query suggestion is presented and interacted-with is a mobile device 1500, including, but is not limited to, a smart phone, a tablet, a music player, a handled gaming console, a global positioning system (GPS) receiver, and a wearable computing device (e.g., eyeglasses, wrist watch, etc.), or in any other form factor. The mobile device 1500 in this example includes one or more central processing units (CPUs) 1540, one or more graphic processing units (GPUs) 1530, a display 1520, a memory 1560, a communication platform 1510, such as a wireless communication module, storage 1590, and one or more input/output (I/O) devices 1550. Any other suitable component, including but not limited to a system bus or a controller (not shown), may also be included in the mobile device 1500. As shown in FIG. 15, a mobile operating system 1570, e.g., iOS, Android, Windows Phone, etc., and one or more applications 1580 may be loaded into the memory 1560 from the storage 1590 in order to be executed by the CPU 1540. The applications 1580 may include a browser or any other suitable mobile apps for receiving search result or query suggestions on the mobile device 1500. User interactions with the search result and query suggestions may be achieved via the I/O devices 1550 and provided to the spelling correction based search suggestion engine 140 and/or other components of systems 100 and 200, e.g., via the network 120.

To implement various modules, units, and their functionalities described in the present disclosure, computer hardware platforms may be used as the hardware platform(s) for one or more of the elements described herein (e.g., the spelling correction based search suggestion engine 140, the search engine 130 and/or other components of systems 100 and 200 described with respect to FIGS. 1-14). The hardware elements, operating systems and programming languages of such computers are conventional in nature, and it is presumed that those skilled in the art are adequately familiar therewith to adapt those technologies about providing spelling correction based query suggestions as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 16:
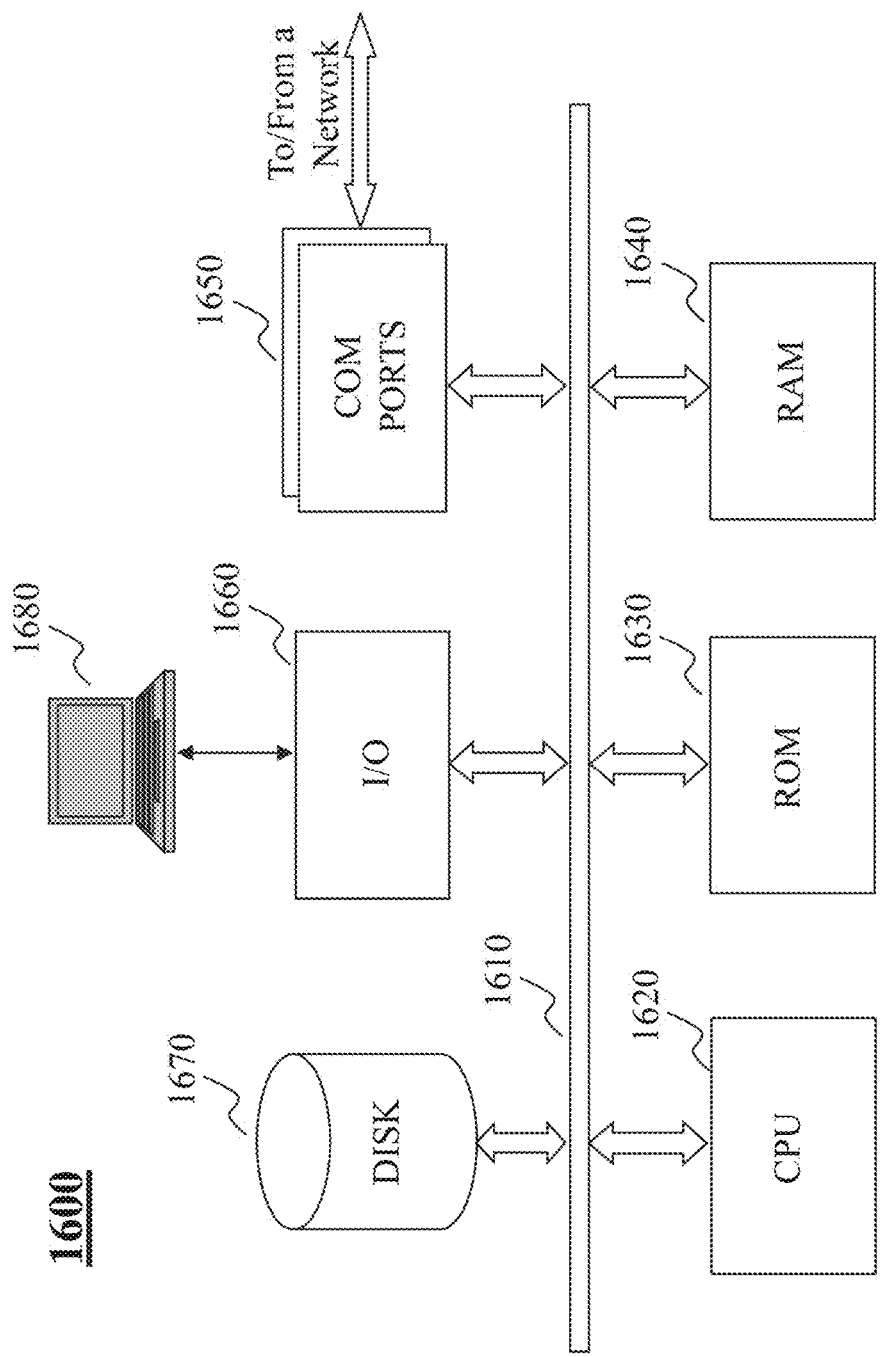
FIG. 16 depicts the architecture of a computer which can be used to implement a specialized system incorporating the present teaching.

FIG. 16 depicts the architecture of a computing device which can be used to realize a specialized system implementing the present teaching. Such a specialized system incorporating the present teaching has a functional block diagram illustration of a hardware platform which includes user interface elements. The computer may be a general purpose computer or a special purpose computer. Both can be used to implement a specialized system for the present teaching. This computer 1600 may be used to implement any component of the techniques of providing spelling correction based query suggestions, as described herein. For example, the search engine 130, the spelling correction based search suggestion engine 140, etc., may be implemented on a computer such as computer 1600, via its hardware, software program, firmware, or a combination thereof. Although only one such computer is shown, for convenience, the computer functions relating to providing spelling correction based query suggestions as described herein may be implemented in a distributed fashion on a number of similar platforms, to distribute the processing load.

The computer 1600, for example, includes COM ports 1650 connected to and from a network connected thereto to facilitate data communications. The computer 1600 also includes a central processing unit (CPU) 1620, in the form of one or more processors, for executing program instructions. The exemplary computer platform includes an internal communication bus 1610, program storage and data storage of different forms, e.g., disk 1670, read only memory (ROM) 1630, or random access memory (RAM) 1640, for various data files to be processed and/or communicated by the computer, as well as possibly program instructions to be executed by the CPU. The computer 1600 also includes an I/O component 1660, supporting input/output flows between the computer and other components therein such as user interface elements 1680. The computer 1600 may also receive programming and data via network communications.

Hence, aspects of the methods of providing spelling correction based query suggestions, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer into the hardware platform(s) of a computing environment or other system implementing a computing environment or similar functionalities in connection with providing spelling correction based query suggestions. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, providing spelling correction based query suggestions as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on a machine having at least one processor, storage, and a communication platform connected to a network for providing a query suggestion, the method comprising:
   receiving a request for query suggestions with respect to a query prefix input by a user, wherein the query prefix includes a misspelled portion;
   obtaining personal data of the user for identifying at least one spelling correction candidate for the query prefix, the personal data including a list of item candidates;
   generating one or more spelling correction candidates based on the personal data and the query prefix, wherein each of the one or more spelling correction candidates represents a possible spelling correction of the query prefix, wherein the one or more spelling correction candidates are generated by:
      determining a set of matching item candidates based on one or more versions of the query prefix and the list of item candidates, wherein each of the one or more versions is determined by shortening the query prefix by one or more characters until a predetermined threshold condition is met, wherein the one or more spelling correction candidates comprise the set of matching candidate items;
   determining one or more query suggestions for the query prefix based on the one or more spelling correction candidates; and
   providing the one or more query suggestions as a response to the request.

2. The method of claim 1, wherein the personal data include information related to at least one of: a personal contact list of the user; a personal search history of the user; a personal online chat history of the user; personal emails of the user; or a personal calendar input of the user.

3. The method of claim 1, wherein determining the set of matching item candidates comprises:
   generating the list of item candidates including one or more item candidates based on the personal data of the user;
   matching the query prefix with the one or more item candidates to determine one or more matched item candidates, wherein:
      shortening the query prefix comprises truncating the query prefix to obtain a truncated query prefix, the truncated query prefix being one of the one or more versions of the query prefix, and the one or more characters that the query prefix are based on a predetermined direction and a predetermined step;
   matching the truncated query prefix with the one or more item candidates to determine one or more additional matched item candidates; and
   repeating the steps of truncating and matching until the predetermined threshold condition is met, the predetermined threshold condition comprising a number of matched item candidates reaching a predetermined threshold, wherein the set of matching item candidates is obtained responsive to the number of matched item candidates reaching the predetermined threshold, and wherein the one or more spelling correction candidates are generated based on the set of matching candidate items.

4. The method of claim 1, wherein determining the one or more query suggestions comprises:
   partitioning each of the one or more spelling correction candidates to generate a candidate prefix based on the query prefix;
   determining an edit distance between the query prefix and each candidate prefix, wherein the edit distance is represented by a minimum number of possible edits to change the candidate prefix to the query prefix;
   obtaining a predetermined threshold related to the edit distance; and
   selecting one or more candidate prefixes based on their respective edit distances and the predetermined threshold.

5. The method of claim 4, wherein determining the one or more query suggestions further comprises:
   aligning text between the query prefix and each of the selected one or more candidate prefixes;
   segmenting the aligned texts of the query prefix and each selected candidate prefix into N-grams;
   obtaining a pre-calculated transformation probability for misspelling a N-gram in the query prefix with a corresponding N-gram in each selected candidate prefix from a database;
   calculating a misspelling likelihood associated with each selected candidate prefix based on the pre-calculated transformation probabilities;
   retrieving a misspelling likelihood threshold; and
   selecting the one or more query suggestions from the selected one or more candidate prefixes based on their respective associated misspelling likelihoods and the misspelling likelihood threshold.

6. The method of claim 5, further comprising:
generating at least one knowledge-based query suggestion based on the query prefix;
determining a score for each of the at least one knowledge-based query suggestion and the one or more query suggestions;
modifying the score for each of the one or more query suggestions based on its associated misspelling likelihood; and
ranking the at least one knowledge-based query suggestion and the one or more query suggestions based on their respective scores and modified scores to generate a ranked list of query suggestions, wherein the one or more query suggestions provided as the response is further based on the ranked list of query suggestions.

7. The method of claim 1, further comprising:
generating at least one knowledge-based query suggestion based on the query prefix; and
providing both the at least one knowledge-based query suggestion and the one or more query suggestions as the response to the request, wherein the one or more query suggestions are to be presented in a different format than that of the at least one knowledge-based query suggestion, and a presentation of the at least one knowledge-based query suggestion and the one or more query suggestions to the user is based on the personal data.

8. A system having at least one processor, storage, and a communication platform connected to a network for providing a query suggestion, comprising:
a query suggestion request parser configured for receiving a request for query suggestions with respect to a query prefix input by a user, wherein the query prefix includes a misspelled portion;
a personal data retriever configured for obtaining personal data of the user for identifying at least one spelling correction candidate for the query prefix, the personal data including a list of item candidates;
a spelling correction candidate generator configured for generating one or more spelling correction candidates based on the personal data and the query prefix, wherein each of the one or more spelling correction candidates represents a possible spelling correction of the query prefix, wherein the one or more spelling correction candidates are generated by:
determining a set of matching item candidates based on one or more versions of the query prefix and the list of item candidates, wherein each of the one or more versions is determined by shortening the query prefix by one or more characters until a predetermined threshold condition is met, wherein the one or more spelling correction candidates comprise the set of matching candidate items;
a spelling correction candidate evaluator configured for determining one or more query suggestions for the query prefix based on the one or more spelling correction candidates; and
a query suggestion integrator configured for providing the one or more query suggestions as a response to the request.

9. The system of claim 8, wherein the personal data include information related to at least one of: a personal contact list of the user; a personal search history of the user; a personal online chat history of the user; personal emails of the user; or a personal calendar input of the user.

10. The system of claim 8, wherein determining the set of matching item candidates comprises:
generating the list of item candidates including one or more item candidates based on the personal data of the user;
matching the query prefix with the one or more item candidates to determine one or more matched item candidates, wherein: shortening the query prefix comprises truncating the query prefix to obtain a truncated query prefix, the truncated query prefix being one of the one or more versions of the query prefix, and the one or more characters that the query prefix are based on a predetermined direction and a predetermined step;
matching the truncated query prefix with the one or more item candidates to determine one or more additional matched item candidates; and
repeating the steps of truncating and matching until the predetermined threshold condition is met, the predetermined threshold condition comprising a number of matched item candidates reaching a predetermined threshold, wherein the set of matching item candidates is obtained responsive to the number of matched item candidates reaching the predetermined threshold, and wherein the one or more spelling correction candidates are generated based on the set of matching candidate items.

11. The system of claim 8, wherein determining the one or more query suggestions comprises:
partitioning each of the one or more spelling correction candidates to generate a candidate prefix based on the query prefix;
determining an edit distance between the query prefix and each candidate prefix, wherein the edit distance is represented by a minimum number of possible edits to change the candidate prefix to the query prefix;
obtaining a predetermined threshold related to the edit distance; and
selecting one or more candidate prefixes based on their respective edit distances and the predetermined threshold.

12. The system of claim 11, wherein determining the one or more query suggestions further comprises:
aligning text between the query prefix and each of the selected one or more candidate prefixes;
segmenting the aligned texts of the query prefix and each selected candidate prefix into N-grams;
obtaining a pre-calculated transformation probability for misspelling a N-gram in the query prefix with a corresponding N-gram in each selected candidate prefix from a database;
calculating a misspelling likelihood associated with each selected candidate prefix based on the pre-calculated transformation probabilities;
retrieving a misspelling likelihood threshold; and
selecting the one or more query suggestions from the selected one or more candidate prefixes based on their respective associated misspelling likelihoods and the misspelling likelihood threshold.

13. The system of claim 12, further comprising:
a knowledge based query suggestion generator configured for generating at least one knowledge-based query suggestion based on the query prefix, wherein the query suggestion integrator is further configured for:
determining a score for each of the at least one knowledge-based query suggestion and the one or more query suggestions;
modifying the score for each of the one or more query suggestions based on its associated misspelling likelihood; and ranking the at least one knowledge-based query suggestion and the one or more query suggestions based on their respective scores and modified scores to generate a ranked list of query suggestions, wherein the one or more query suggestions provided as the response is further based on the ranked list of query suggestions.

14. The system of claim 8, further comprising:
a knowledge based query suggestion generator configured for generating at least one knowledge-based query suggestion based on the query prefix, wherein the query suggestion integrator is further configured for:
providing both the at least one knowledge-based query suggestion and the one or more query suggestions as the response to the request, wherein the one or more query suggestions are to be presented in a different format than that of the at least one knowledge-based query suggestion, and a presentation of the at least one knowledge-based query suggestion and the one or more query suggestions to the user is based on the personal data.

15. A non-transitory machine-readable medium having information recorded thereon for providing a query suggestion, wherein the information, when read by the machine, causes the machine to perform the following:
receiving a request for query suggestions with respect to a query prefix input by a user, wherein the query prefix includes a misspelled portion;
obtaining personal data of the user for identifying at least one spelling correction candidate for the query prefix, the personal data including a list of item candidates;
generating one or more spelling correction candidates based on the personal data and the query prefix, wherein each of the one or more spelling correction candidates represents a possible spelling correction of the query prefix, wherein the one or more spelling correction candidates are generated by:
determining a set of matching item candidates based on one or more versions of the query prefix and the list of item candidates, wherein each of the one or more versions is determined by shortening the query prefix by one or more characters until a predetermined threshold condition is met, wherein the one or more spelling correction candidates comprise the set of matching candidate items;
determining one or more query suggestions for the query prefix based on the one or more spelling correction candidates; and
providing the one or more query suggestions as a response to the request.

16. The medium of claim 15, wherein the personal data include information related to at least one of: a personal contact list of the user; a personal search history of the user; a personal online chat history of the user; personal emails of the user; or a personal calendar input of the user.

17. The medium of claim 15, wherein determining the set of matching item candidates comprises:
generating the list of item candidates including one or more item candidates based on the personal data of the user;
matching the query prefix with the one or more item candidates to determine one or more matched item candidates, wherein:
shortening the query prefix comprises truncating the query prefix to obtain a truncated query prefix, the truncated query prefix being one of the one or more versions of the query prefix, and the one or more characters that the query prefix are based on a predetermined direction and a predetermined step;
matching the truncated query prefix with the one or more item candidates to determine one or more additional matched item candidates; and
repeating the steps of truncating and matching until the predetermined threshold condition is met, the predetermined threshold condition comprising a number of matched item candidates reaching a predetermined threshold, wherein the set of matching item candidates is obtained responsive to the number of matched item candidates reaching the predetermined threshold, and wherein the one or more spelling correction candidates are generated based on the set of matching candidate items.

18. The medium of claim 15, wherein determining the one or more query suggestions comprises:
partitioning each of the one or more spelling correction candidates to generate a candidate prefix based on the query prefix;
determining an edit distance between the query prefix and each candidate prefix, wherein the edit distance is represented by a minimum number of possible edits to change the candidate prefix to the query prefix;
obtaining a predetermined threshold related to the edit distance; and
selecting one or more candidate prefixes based on their respective edit distances and the predetermined threshold.

19. The medium of claim 18, wherein determining the one or more query suggestions further comprises:
aligning text between the query prefix and each of the selected one or more candidate prefixes;
segmenting the aligned texts of the query prefix and each selected candidate prefix into N-grams;
obtaining a pre-calculated transformation probability for misspelling a N-gram in the query prefix with a corresponding N-gram in each selected candidate prefix from a database;
calculating a misspelling likelihood associated with each selected candidate prefix based on the pre-calculated transformation probabilities;
retrieving a misspelling likelihood threshold; and
selecting the one or more query suggestions from the selected one or more candidate prefixes based on their respective associated misspelling likelihoods and the misspelling likelihood threshold.

20. The medium of claim 19, wherein the information, when read by the machine, further causes the machine to perform the following:
generating at least one knowledge-based query suggestion based on the query prefix;
determining a score for each of the at least one knowledge-based query suggestion and the one or more query suggestions;
modifying the score for each of the one or more query suggestions based on its associated misspelling likelihood; and
ranking the at least one knowledge-based query suggestion and the one or more query suggestions based on their respective scores and modified scores to generate a ranked list of query suggestions, wherein the one or more query suggestions provided as the response is further based on the ranked list of query suggestions.

21. The medium of claim 15, wherein the information, when read by the machine, further causes the machine to perform the following:

generating at least one knowledge-based query suggestion based on the query prefix; and providing both the at least one knowledge-based query suggestion and the one or more query suggestions as the response to the request, wherein the one or more query suggestions are to be presented in a different format than that of the at least one knowledge-based query suggestion, and a presentation of the at least one knowledge-based query suggestion and the one or more query suggestions to the user is based on the personal data.

* * * * *